US012556965B2

(12) United States Patent
Wang et al.

(10) Patent No.: US 12,556,965 B2
(45) Date of Patent: Feb. 17, 2026

(54) LOGICAL CHANNEL GROUPS FOR SIDELINK BUFFER STATUS REPORT FORWARDING

(71) Applicant: QUALCOMM Incorporated, San Diego, CA (US)

(72) Inventors: Hua Wang, Basking Ridge, NJ (US); Sony Akkarakaran, Poway, CA (US); Jung Ho Ryu, Fort Lee, NJ (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/811,557

(22) Filed: Jul. 8, 2022

(65) Prior Publication Data
US 2024/0015571 A1    Jan. 11, 2024

(51) Int. Cl.
*H04W 28/02*    (2009.01)

(52) U.S. Cl.
CPC ... *H04W 28/0278* (2013.01); *H04W 28/0252* (2013.01)

(58) Field of Classification Search
CPC ..... H04W 88/04; H04W 72/21; H04W 72/04; H04W 28/0278; H04W 72/52; H04W 76/14; H04W 28/0252; H04W 72/25; H04W 72/23; H04W 72/56
See application file for complete search history.

(56) References Cited

U.S. PATENT DOCUMENTS

| 10,356,656 | B2 | 7/2019 | Lee et al. |
| 2017/0048745 | A1* | 2/2017 | Yi ..................... H04W 28/0278 |
| 2017/0118671 | A1* | 4/2017 | Lee ....................... H04W 72/02 |
| 2017/0353819 | A1 | 12/2017 | Yin et al. |

(Continued)

FOREIGN PATENT DOCUMENTS

KR    20170020122 A    2/2017

OTHER PUBLICATIONS

Samsung, "Sidelink BSR Triggering", 3GPP TSG RAN WG2 Meeting #92, R2-156156 (Year: 2015).*

(Continued)

*Primary Examiner* — Ayaz R Sheikh
*Assistant Examiner* — Mang Boi Thawng
(74) *Attorney, Agent, or Firm* — Harrity & Harrity, LLP/QUALCOMM Incorporated

(57) ABSTRACT

Various aspects of the present disclosure generally relate to wireless communication. In some aspects, a first network node may receive, from a second network node of the multi-hop sidelink network, a first sidelink communication comprising second buffer status information associated with the second network node, wherein the second buffer status information is associated with a second logical channel group (LCG) of a plurality of LCGs. The first network node may transmit, to a third network node of the multi-hop sidelink network, a sidelink buffer status report (BSR) indicative of the second buffer status information and first buffer status information associated with the first network node, wherein the first buffer status information is associated with a first LCG of the plurality of LCGs. Numerous other aspects are described.

33 Claims, 12 Drawing Sheets

(56) References Cited

U.S. PATENT DOCUMENTS

| | | | |
|---|---|---|---|
| 2021/0298034 A1* | 9/2021 | He | H04W 72/56 |
| 2021/0298043 A1* | 9/2021 | He | H04W 28/0278 |
| 2022/0217743 A1* | 7/2022 | Zhou | H04W 72/1263 |
| 2022/0279377 A1* | 9/2022 | Liu | H04W 80/02 |
| 2022/0394542 A1* | 12/2022 | Belleschi | H04W 72/543 |
| 2023/0276476 A1* | 8/2023 | Zhang | H04W 72/04 370/329 |
| 2024/0015572 A1 | 1/2024 | Wang et al. | |

OTHER PUBLICATIONS

Huawei, et al., "Discussion on Multiple Relay UE IDs for a Relay UE", 3GPP TSG-RAN WG2 Meeting #93, R2-161072, 3rd Generation Partnership Project Mobile Competence Centre, 650, Route Des Lucioles, F-06921 Sophia-antipolis Cedex, France, vol. RAN WG2, No., Malta, Feb. 15-19, 2016, 5 Pages, XP051055070, figures 1, 2, 3, sections: 2, 3, 4, p. 1-4.

International Search Report and Written Opinion—PCT/US2023/069290—ISA/EPO—Oct. 2, 2023.

\* cited by examiner

LOGICAL CHANNEL GROUPS FOR SIDELINK BUFFER STATUS REPORT FORWARDING

INTRODUCTION

Aspects of the present disclosure generally relate to wireless communication and to techniques and apparatuses for sidelink buffer status reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors coupled to the memory. The one or more processors may be configured to receive, from a second network node of the multi-hop sidelink network, a first sidelink communication comprising second buffer status information associated with the second network node, wherein the second buffer status information is associated with a second logical channel group (LCG) of a plurality of LCGs. The one or more processors may be configured to transmit, to a third network node of the multi-hop sidelink network, a sidelink buffer status report (BSR) indicative of the second buffer status information and first buffer status information associated with the first network node, wherein the first buffer status information is associated with a first LCG of the plurality of LCGs.

Some aspects described herein relate to a first network node for wireless communication. The first network node may include a memory and one or more processors coupled to the memory. The one or more processors may be configured to transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels. The one or more processors may be configured to receive, from a second network node, a sidelink BSR indicative of first buffer status information associated with the second network node and second buffer status information associated with a third network node, wherein the first buffer status information is associated with a first LCG of the plurality of LCGs.

Some aspects described herein relate to a method of wireless communication performed by a first network node of a multi-hop sidelink network. The method may include receiving, from a second network node of the multi-hop sidelink network, a first sidelink communication comprising second buffer status information associated with the second network node, wherein the second buffer status information is associated with a second LCG of a plurality of LCGs. The method may include transmitting, to a third network node of the multi-hop sidelink network, a sidelink BSR indicative of the second buffer status information and first buffer status information associated with the first network node, wherein the first buffer status information is associated with a first LCG of the plurality of LCGs.

Some aspects described herein relate to a method of wireless communication performed by a first network node. The method may include transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels. The method may include receiving, from a second network node, a sidelink BSR indicative of first buffer status information associated with the second network node and second buffer status information associated with a third network node, wherein the first buffer status information is associated with a first LCG of the plurality of LCGs.

Some aspects described herein relate to a non-transitory computer-readable medium that stores a set of instructions for wireless communication by a first network node. The set of instructions, when executed by one or more processors of the first network node, may cause the first network node to receive, from a second network node of the multi-hop sidelink network, a first sidelink communication comprising second buffer status information associated with the second network node, wherein the second buffer status information is associated with a second LCG of a plurality of LCGs. The set of instructions, when executed by one or more processors of the first network node, may cause the first network node to transmit, to a third network node of the multi-hop sidelink network, a sidelink BSR indicative of the second buffer status information and first buffer status information associated with the first network node, wherein the first buffer status information is associated with a first LCG of the plurality of LCGs.

Some aspects described herein relate to a non-transitory computer-readable medium that stores a set of instructions for wireless communication by a first network node. The set of instructions, when executed by one or more processors of the first network node, may cause the first network node to transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels. The set of instructions, when executed by one or more processors of the first network node, may cause the first network node to receive, from a second network node, a sidelink BSR indicative of first buffer status information associated with the second network node and second buffer status information associated with a third network node, wherein the first buffer status information is associated with a first LCG of the plurality of LCGs.

Some aspects described herein relate to an apparatus for wireless communication. The apparatus may include means for receiving, from a first network node of the multi-hop sidelink network, a first sidelink communication comprising second buffer status information associated with the first network node, wherein the second buffer status information is associated with a second LCG of a plurality of LCGs. The apparatus may include means for transmitting, to a second network node of the multi-hop sidelink network, a sidelink BSR indicative of the second buffer status information and first buffer status information associated with the apparatus, wherein the first buffer status information is associated with a first LCG of the plurality of LCGs.

Some aspects described herein relate to an apparatus for wireless communication. The apparatus may include means for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels. The apparatus may include means for receiving, from a first network node, a sidelink BSR indicative of first buffer status information associated with the first network node and second buffer status information associated with a second network node, wherein the first buffer status information is associated with a first LCG of the plurality of LCGs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
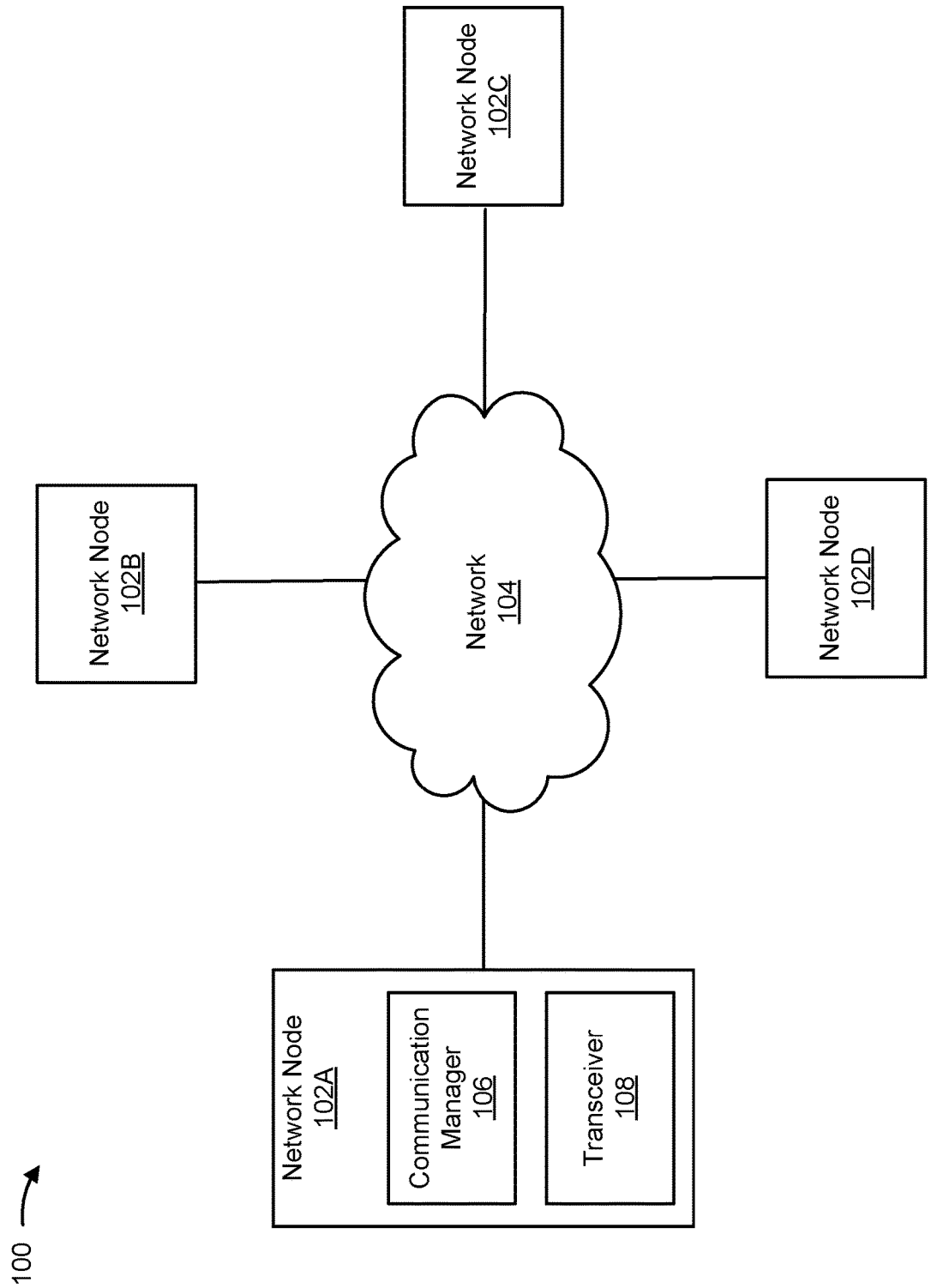
FIG. 1 is a diagram illustrating an example environment in which apparatuses and/or methods described herein may be implemented, in accordance with the present disclosure.

Some aspects of the techniques and apparatuses described herein may facilitate sidelink buffer status reporting for multi-hop sidelink networks. In some aspects, a first network node may receive, from a second network node, a first sidelink communication that includes a buffer status report (BSR) indicating buffer status information associated with the second network node. Buffer status information is information associated with a status of a buffer of a network node. For example, buffer status information may indicate whether or not the buffer includes data to be transmitted and/or an amount of data (e.g., in bytes) to be transmitted. The first network node may transmit, to a third network node, a sidelink BSR indicative of its own buffer status information in addition to the received buffer status information. The second network node may be referred to as a downstream network node with respect to the first network node. A second network node is downstream from a first network node if the second network node transmits buffer status information to the first network node. In this way, upstream network nodes may be made aware of the buffer status information of downstream network nodes and, may, as a result, make more appropriate sidelink resource allocations and scheduling decisions.

The sidelink BSR may be transmitted as a medium access control (MAC) control element (MAC CE). The MAC CE may include a field that indicates a logical channel group identifier (LCGID) associated with a network node and/or a communication link between a network node and a downstream network node. In some aspects, the LCGID may correspond to a relay route associated with the network node. The relay route is a direction of travel associated with buffer status information and may be indicated as a series of communication links between a network node and an upstream network node. A logical channel group is a group of logical channels. A logical channel is an information stream dedicated to the transfer of a specific type of information over a radio interface. Logical channels are provided on top of the MAC layer of a wireless communication standard protocol stack.

The sidelink BSR forwarding described above may be performed using a separate sidelink BSR forwarding technique or an aggregated sidelink BSR forwarding technique. In separate sidelink BSR forwarding, the sidelink BSR includes separate indications for the buffer status information associated with the network node transmitting the sidelink BSR and one or more network nodes downstream of the transmitting network node. In aggregated sidelink BSR forwarding, the sidelink BSR indicates buffer status information that is an aggregated buffer size. The aggregated buffer size is an aggregation of the buffer size associated with the transmitting network node and the buffer sizes of one or more downstream network nodes.

In some aspects, a reported buffer size may be associated with an LCG. In some cases, the LCGs can be different from one network node to another. For example, two network nodes can have different associated LCGs and/or two LCGs can have a same LCGID but different logical channels. Using more consistent LCGs and/or other strategies for minimizing ambiguity associated with LCG indications may facilitate less ambiguity regarding associated logical channels and, thus, more appropriate sidelink resource grants.

Some aspects of the techniques and apparatuses described herein may include techniques associated with logical channel groups for sidelink buffer status report forwarding in multi-hop sidelink networks. For example, in some aspects, system-wide definitions (e.g., definitions that apply to all network nodes in a multi-hop sidelink network) of LCGs may be used so that an LCG associated with two or more different network nodes includes the same set of logical channels, respectively. In some aspects, consistent definitions of LCGs may be used without defining system-wide LCG definitions. For example, in some aspects, each LCG of a network node may be defined to be a union of the LCGs of any network nodes downstream of the network node. In some aspects, rather than defining LCGs consistently, a forwarding network node may assign portions of a total buffer size associated with an LCG to one or more logical channels included in the LCG to approximate the distribution of buffer size among the logical channels. In this way, some aspects of the techniques and apparatuses described herein may reduce or remove ambiguity associated with logical channels in forwarded sidelink BSRs and, thus, facilitate increased efficiency and/or effectiveness of sidelink resource allocation, thereby positively impacting network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

FIG. 1 is a diagram illustrating an example environment 100 in which apparatuses and/or methods described herein may be implemented, in accordance with the present disclosure. As shown in FIG. 1, the environment 100 may include a network node 102A, a network node 102B, a network node 102C, and a network node 102D, that may communicate with one another via a network 104. The network nodes 102A, 102B, 102C, and 102D may be dispersed throughout the network 104, and each network node 102A, 102B, 102C, and 102D may be stationary and/or mobile. The network 104 may include wired communication connections, wireless communication connections, or a combination of wired and wireless communication connections.

The network 104 may include, for example, a cellular network (e.g., a Long-Term Evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 104 may be deployed in a given geographic area. Each network 104 may support a particular radio access technology (RAT) and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, Open-RAT, New Radio (NR) or 5G RAT networks may be deployed.

In some aspects, the environment 100 may include one or more non-terrestrial network (NTN) deployments in which a non-terrestrial wireless communication device may include a non-terrestrial network node (e.g., the network nodes 102A, 102B, 102C, and/or 102D). The non-terrestrial network node may include a network node such as, for example, a user equipment (UE) (which may be referred to herein, interchangeably, as a "non-terrestrial UE"), a base station (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial network node such as a non-terrestrial UE, a non-terrestrial base station, and/or a non-terrestrial relay station, among other examples.

One or more of the network nodes 102A, 102B, 102C, and 102D may be, include, or be included in, any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. Satellites may communicate directly and/or indirectly with other entities in the environment using satellite communication. The other entities may include UEs (e.g., terrestrial UEs and/or non-terrestrial UEs), other satellites in the one or more NTN deployments, other types of base stations (e.g., stationary and/or ground-based BSs), relay stations, and/or one or more components and/or devices included in a core network, among other examples.

As described herein, a network node (which may alternatively be referred to as a node, a network entity, or a wireless node) may be, be similar to, include, or be included in (e.g., be a component of) a base station (e.g., any base station described herein, including a disaggregated base station), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity.

The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. As an example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples.

Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As shown, the network node 102A may include a communication manager 106 and a transceiver 108. The communication manager 106 may be configured to perform one or more communication tasks as described herein. In some aspects, the communication manager 106 may direct the transceiver 108 to perform one or more communication tasks as described herein. Although depicted, for clarity of description, with reference only to the network node 102A, any one or more of the network nodes 102B, 102C, and 102D also may include a communication manager and a transceiver.

As described in more detail elsewhere herein, the communication manager 106 and/or the transceiver 108 may receive, from a second network node of the multi-hop sidelink network, a first sidelink communication comprising second buffer status information associated with the second network node, wherein the second buffer status information is associated with a second logical channel group (LCG) of a plurality of LCGs; and transmit, to a third network node of the multi-hop sidelink network, a sidelink BSR indicative of the second buffer status information and first buffer status information associated with the first network node, wherein the first buffer status information is associated with a first LCG of the plurality of LCGs.

In some aspects, the communication manager 106 and/or the transceiver 108 may transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels; and receive, from a second network node, a sidelink BSR indicative of first buffer status information associated with the second network node and second buffer status information associated with a third network node, wherein the first buffer status information is associated with a first LCG of the plurality of LCGs. Additionally, or alternatively, the communication manager 106 and/or the transceiver 108 may perform one or more other operations described herein.

The number and arrangement of entities shown in FIG. 1 are provided as one or more examples. In practice, there may be additional network nodes and/or networks, fewer network nodes and/or networks, different network nodes and/or networks, or differently arranged network nodes and/or networks than those shown in FIG. 1. Furthermore, the network nodes 102A, 102B, 102C, and/or 102D may be implemented using a single apparatus or multiple apparatuses.

Figure 2:
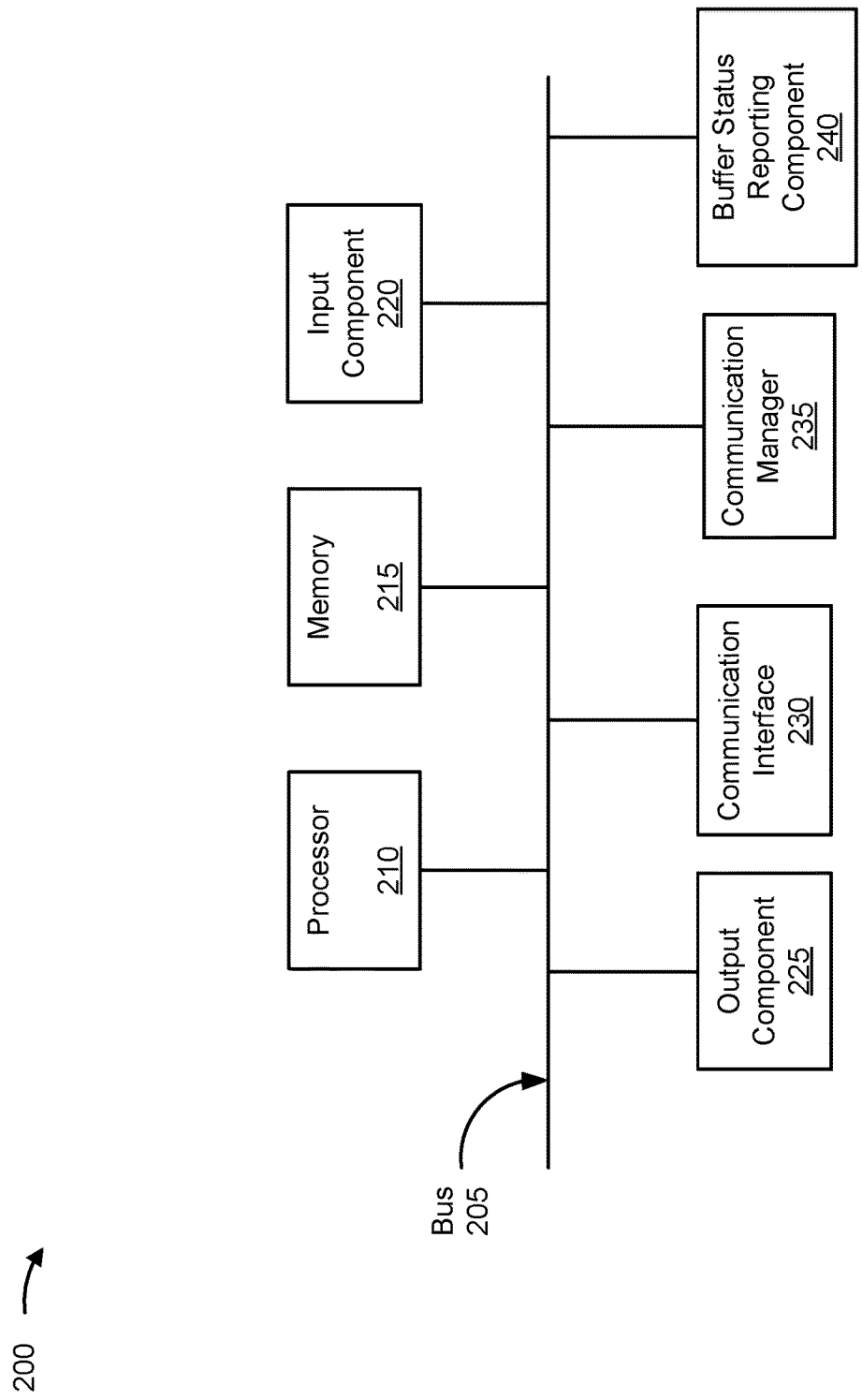
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network nodes 102A, 102B, 102C, and/or 102D. Additionally, or alternatively, any one or more of the network nodes 102A, 102B, 102C, and/or 102D may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. As shown in FIG. 2, the apparatus 200 may include components such as a bus 205, a processor 210, a memory 215, an input component 220, an output component 225, a communication interface 230, a communication manager 235, and a buffer status reporting component 240. Any one or more of the components 205, 210, 215, 220, 225 230, 235, and/or 240 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. In some aspects, the processor 210 includes one or more processors capable of being programmed to perform a function.

The memory 215 includes a random-access memory (RAM), a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit ($I^2C$), and/or a serial peripheral interface (SPI), among other examples.

The communication manager 235 may include hardware, software, or a combination of hardware and software configured to cause the apparatus 200 to perform one or more communication tasks associated with the communication manager 106 and/or the transceiver 108. In some aspects, the communication manager 235 may be, be similar to, include, or be included in, the communication manager 106 depicted in FIG. 1. In some aspects, the communication manager 235 may include the processor 210, the memory 215, the input component 220, the output component 225, the communication interface 230, and/or the buffer status reporting component 240, and/or one or more aspects thereof.

As indicated above, FIG. 2 is provided as an example. Other examples may differ from what is described with regard to FIG. 2.

As described above, in some aspects, the network 104 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
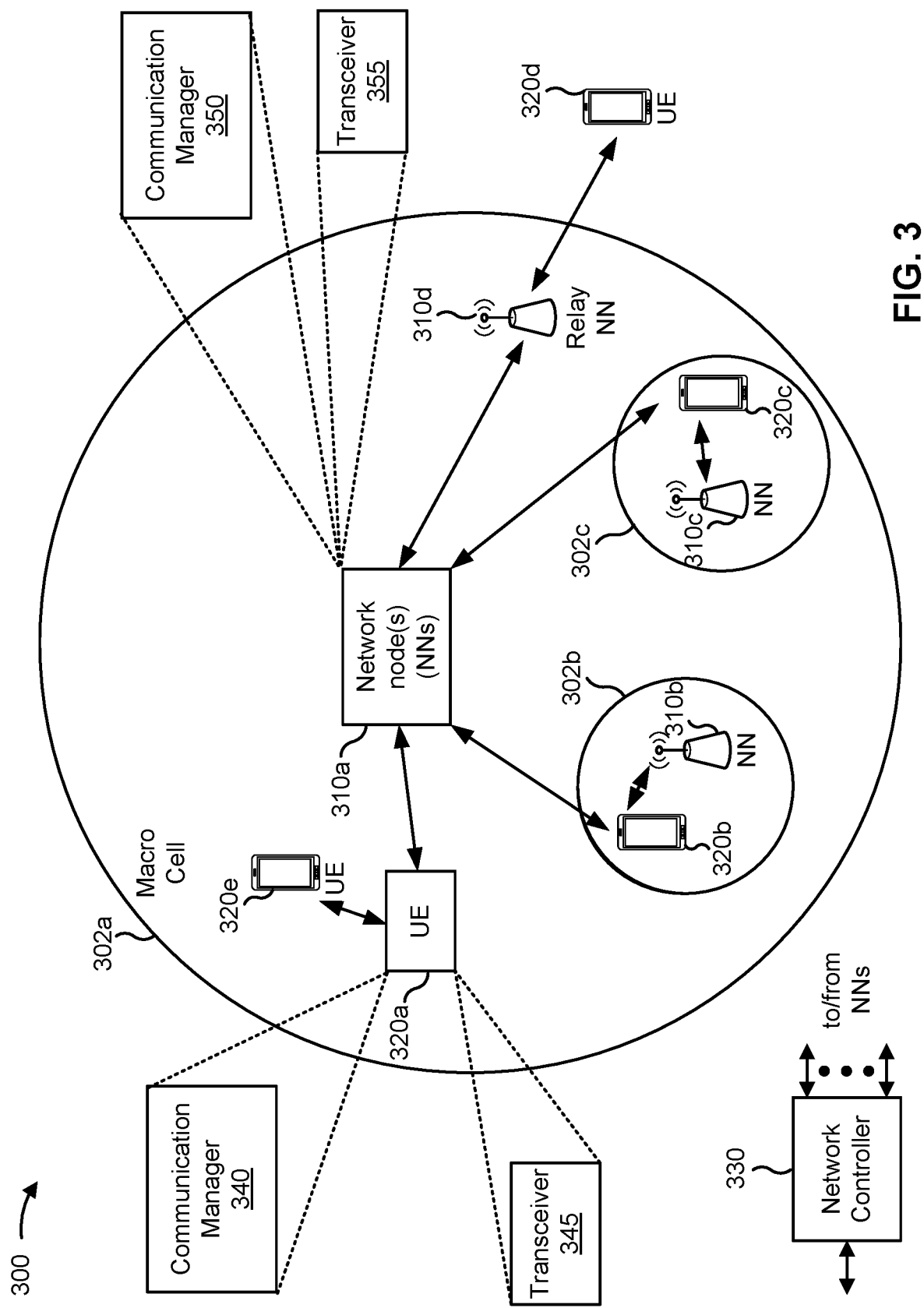
FIG. 3 is a diagram illustrating an example of a wireless network, in accordance with the present disclosure.

FIG. 3 is a diagram illustrating an example of a wireless network 300, in accordance with the present disclosure. The wireless network 300 may be or may include elements of a 5G (e.g., NR) network and/or a 4G (e.g., LTE) network, among other examples. The wireless network 300 may include one or more network nodes 310 (shown as a network node 310a, a network node 310b, a network node 310c, and a network node 310d), a UE 320 or multiple UEs 320 (shown as a UE 320a, a UE 320b, a UE 320c, a UE 320d, and a UE 320e), and/or other entities. A network node 310 is a network node that communicates with UEs 320. As shown, a network node 310 may include one or more network nodes. For example, a network node 310 may be an aggregated network node, meaning that the aggregated network node is configured to utilize a radio protocol stack that is physically or logically integrated within a single radio access network (RAN) node (e.g., within a single device or unit). As another example, a network node 310 may be a disaggregated network node (sometimes referred to as a disaggregated base station), meaning that the network node 310 is configured to utilize a protocol stack that is physically or logically distributed among two or more nodes (such as one or more CUs, one or more DUs, or one or more RUs).

In some examples, a network node 310 is or includes a network node that communicates with UEs 320 via a radio access link, such as an RU. In some examples, a network node 310 is or includes a network node that communicates with other network nodes 310 via a fronthaul link or a midhaul link, such as a DU. In some examples, a network node 310 is or includes a network node that communicates with other network nodes 310 via a midhaul link or a core network via a backhaul link, such as a CU. In some examples, a network node 310 (such as an aggregated network node 310 or a disaggregated network node 310) may include multiple network nodes, such as one or more RUs, one or more CUs, and/or one or more DUs. A network node 310 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 310 may be interconnected to one another or to one or more other network nodes 310 in the wireless network 300 through various types of fronthaul, midhaul, and/or backhaul interfaces, such as a direct physical connection, an air interface, or a virtual network, using any suitable transport network.

In some examples, a network node 310 may provide communication coverage for a particular geographic area. In the Third Generation Partnership Project (3GPP), the term "cell" can refer to a coverage area of a network node 310 and/or a network node subsystem serving this coverage area, depending on the context in which the term is used. A network node 310 may provide communication coverage for a macro cell, a pico cell, a femto cell, and/or another type of cell. A macro cell may cover a relatively large geographic area (e.g., several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (e.g., a home) and may allow restricted access by UEs 320 having association with the femto cell (e.g., UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. In the example shown in FIG. 3, the network node 310a may be a macro network node for a macro cell 302a, the network node 310b may be a pico network node for a pico cell 302b, and the network node 310c may be a femto network node for a femto cell 302c. A network node may support one or multiple (e.g., three) cells. In some examples, a cell may not necessarily be stationary, and the geographic area of the cell may move according to the location of a network node 310 that is mobile (e.g., a mobile network node).

In some aspects, the term "base station" or "network node" may refer to an aggregated base station, a disaggregated base station, an IAB node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 310. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 300 may include one or more relay stations. A relay station is a network node that can receive a transmission of data from an upstream node (e.g., a network node 310 or a UE 320) and send a transmission of the data to a downstream node (e.g., a UE 320 or a network node 310). A relay station may be a UE 320 that can relay transmissions for other UEs 320. In the example shown in FIG. 3, the network node 310d (e.g., a relay network node) may communicate with the network node 310a (e.g., a macro network node) and the UE 320d in order to facilitate communication between the network node 310a and the UE 320d. A network node 310 that relays communications may be referred to as a relay station, a relay base station, a relay network node, a relay node, a relay, or the like.

The wireless network 300 may be a heterogeneous network that includes network nodes 310 of different types, such as macro network nodes, pico network nodes, femto network nodes, relay network nodes, or the like. These different types of network nodes 310 may have different transmit power levels, different coverage areas, and/or different impacts on interference in the wireless network 300. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 330 may couple to or communicate with a set of network nodes 310 and may provide coordination and control for these network nodes 310. The network controller 330 may communicate with the network nodes 310 via a backhaul communication link or a midhaul communication link. The network nodes 310 may communicate with one another directly or indirectly via a wireless or wireline backhaul communication link. In some aspects, the network controller 330 may be a CU or a core network device, or may include a CU or a core network device.

For example, in some aspects, the wireless network 300 may be, include, or be included in a wireless backhaul network, sometimes referred to as an IAB network. In an IAB network, at least one network node (e.g., network node 310) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 320) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor base station. An IAB donor may include a CU, which may perform access node controller (ANC) functions and/or AMF functions. The CU may configure a DU of the IAB donor and/or may configure one or more IAB nodes (e.g., a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 320. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 320. A UE 320 may include only MT functions, and not DU functions. That is, communications of a UE 320 may be controlled and/or scheduled by an IAB donor and/or an IAB node (e.g., a parent node of the UE 320).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 320. Communications of an MT function of a child node may be controlled and/or scheduled by a parent node of the child node.

A link between a UE 320 and an IAB donor, or between a UE 320 and an IAB node, may be referred to as an access link. An access link may be a wireless access link that provides a UE 320 with radio access to a core network via an IAB donor, and optionally via one or more IAB nodes. Thus, the wireless network 300 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 320 may be dispersed throughout the wireless network 300, and each UE 320 may be stationary or mobile. A UE 320 may include, for example, an access terminal, a terminal, a mobile station, and/or a subscriber unit. A UE 320 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 320 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 320 may be considered Internet-of-Things (IoT) devices, and/or may be implemented as NB-IoT (narrowband IoT) devices. Some UEs 320 may be considered a Customer Premises Equipment. A UE 320 may be included inside a housing that houses components of the UE 320, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 300 may be deployed in a given geographic area. Each wireless network 300 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 320 (e.g., shown as UE 320a and UE 320e) may communicate directly using one or more sidelink channels (e.g., without using a network node 310 as an intermediary to communicate with one another). For example, the UEs 320 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 320 may perform scheduling operations, resource selection operations, and/or other operations described elsewhere herein as being performed by the network node 310.

Devices of the wireless network 300 may communicate using the electromagnetic spectrum, which may be subdivided by frequency or wavelength into various classes, bands, channels, or the like. For example, devices of the wireless network 300 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described above, in some aspects, a network node (e.g., the network nodes 102A, 102B, 102C, and/or 102D depicted in FIG. 1) may be implemented in a wireless communication environment. For example, in some aspects, the network node may be implemented as a UE, a base station, relay device, and/or TRP, among other examples. In some such aspects, as shown in FIG. 3, the UE 320a may include a communication manager 340 and/or a transceiver 345 and the network node 310a may include a communication manager 350 and/or a transceiver 355. In some aspects, the communication manager 340 and/or 350 may be, be similar to, include, or be included in, the communication manager 106 depicted in FIG. 1 and/or the communication manager 235 depicted in FIG. 2. In some aspects, the transceiver 345 and/or 355 may be, be similar to, include, or be included in, the transceiver 108 depicted in FIG. 1. In some aspects, the transceiver 345 and/or 355 may include, or be included in, the communication interface 230 depicted in FIG. 2.

In some aspects, a first network node (e.g., a UE 320 and/or a network node 310 may include a communication manager 340 and/or 350). As described in more detail elsewhere herein, the communication manager 340 and/or 350 may receive, from a second network node of the multi-hop sidelink network, a first sidelink communication comprising second buffer status information associated with the second network node, wherein the second buffer status information is associated with a second LCG of a plurality of LCGs; and transmit, to a third network node of the multi-hop sidelink network, a sidelink BSR indicative of the second buffer status information and first buffer status information associated with the first network node, wherein the first buffer status information is associated with a first LCG of the plurality of LCGs.

In some aspects, the communication manager 340 and/or 350 may transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels; and receive, from a second network node, a sidelink BSR indicative of first buffer status information associated with the second network node and second buffer status information associated with a third network node, wherein the first buffer status information is associated with a first LCG of the plurality of LCGs. Additionally, or alternatively, the communication manager 340 and/or 350 may perform one or more other operations described herein.

As indicated above, FIG. 3 is provided as an example. Other examples may differ from what is described with regard to FIG. 3.

Figure 4:
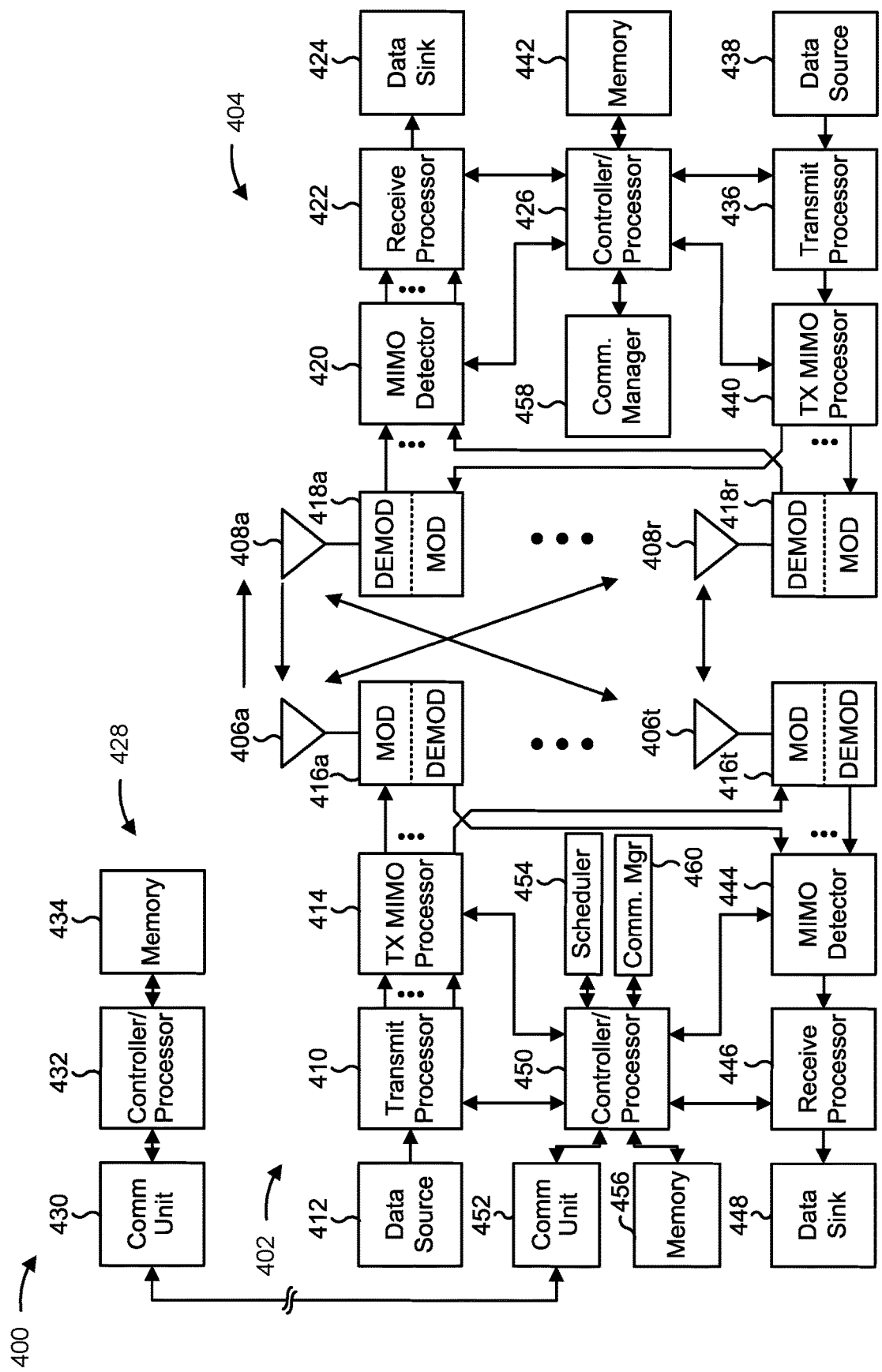
FIG. 4 is a diagram illustrating an environment including a network node in wireless communication with a network node (e.g., via a network such as the network depicted in FIG. 1 and/or the wireless network depicted in FIG. 3), in accordance with the present disclosure.

FIG. 4 is a diagram illustrating an environment 400 including a network node 402 in wireless communication with a network node 404 (e.g., via a network such as the network 104 depicted in FIG. 1 and/or the wireless network 300 depicted in FIG. 3), in accordance with the present disclosure. The network node 402 may be equipped with a set of antennas 406a through 406t, such as T antennas (T≥1). The network node 404 may be equipped with a set of antennas 408a through 408r, such as R antennas (R≥1).

At the network node 402, a transmit processor 410 may receive data, from a data source 412, intended for the network node 404 (or a set of network nodes 404). The transmit processor 410 may select one or more modulation and coding schemes (MCSs) for the network node 404 based on one or more channel quality indicators (CQIs) received from that network node 404. The network node 402 may process (e.g., encode and modulate) the data for the network node 404 based on the MCS(s) selected for the network node 404 and may provide data symbols for the network node 404. The transmit processor 410 may process system information (e.g., for semi-static resource partitioning information (SRPI)) and control information (e.g., CQI requests, grants, and/or upper layer signaling) and provide overhead symbols and control symbols. The transmit processor 410 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 414 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 416a through 416t (e.g., T modems). For example, each output symbol stream may be provided to a modulator component (shown as MOD) of a modem of the set of modems 416a through 416t. Each modem of the set of modems 416a through 416t may use a respective modulator component to process a respective output symbol stream (e.g., for OFDM) to obtain an output sample stream. Each modem of the set of modems 416a through 416t may further use a respective modulator component to process (e.g., convert to analog, amplify, filter, and/or upconvert) the output sample stream to obtain a signal. One or more modems of the set of modems 416a through 416t may transmit a set of signals (e.g., T signals) via a corresponding antenna of the set of antennas 406a through 406t. The signal may include, for example, a downlink signal.

At the network node 404, one or more antennas of the set of antennas 408a through 408r may receive the signals from the network node 402 and/or other network nodes and may provide a set of received signals (e.g., R received signals) to one or more modems of a set of modems 418a through 418r (e.g., R modems). For example, each received signal may be provided to a demodulator component (shown as DEMOD) of a respective modem of the set of modems 418a through 418r. Each modem of the set of modems 418a through 418r may use a respective demodulator component to condition (e.g., filter, amplify, downconvert, and/or digitize) a received signal to obtain input samples. Each modem of the set of modems 418a through 418r may use a demodulator component to further process the input samples (e.g., for OFDM) to obtain received symbols. A MIMO detector 420 may obtain received symbols from one or more modems of the set of modems 418a through 418r, may perform MIMO detection on the received symbols if applicable, and may provide detected symbols.

A receive processor 422 may process (e.g., demodulate and decode) the detected symbols, may provide decoded data for the network node 404 to a data sink 424, and may provide decoded control information and system information to a controller/processor 426. The term "controller/processor" may refer to one or more controllers, one or more processors, or a combination thereof. The controller/processor 426 may be, be similar to, include, or be included in, the processor 210 depicted in FIG. 2. The controller/processor 426 may determine a reference signal received power (RSRP) parameter, a received signal strength indicator (RSSI) parameter, a reference signal received quality (RSRQ) parameter, and/or a CQI parameter, among other examples.

A network controller 428 may include a communication unit 430, a controller/processor 432, and a memory 434. The network controller 428 may be, be similar to, include, or be included in, the network controller 330 depicted in FIG. 3. The network controller 428 may include, for example, one or more devices in a core network. The network controller 428 may communicate with the network node 402 via the communication unit 430.

One or more antennas (e.g., antennas 406a through 406t and/or antennas 408a through 408r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 4.

Similarly, at the network node 404, a transmit processor 436 may receive and process data from a data source 438 and control information (e.g., for reports that include RSRP, RSSI, RSRQ, and/or CQI) from the controller/processor 426. The transmit processor 436 may generate reference symbols for one or more reference signals. The symbols from the transmit processor 436 may be precoded by a TX MIMO processor 440 if applicable, and further processed by one or more of the set of modems 418a through 418r (e.g., for DFT-s-OFDM or CP-OFDM), and transmitted to the network node 402. In some examples, each modem of the set of modems 418a through 418r of the network node 404 may include a modulator and a demodulator. In some examples, the network node 404 includes a transceiver. The transceiver may include any combination of the antenna(s) 408a through 408r, the modem(s) 418a through 418r, the MIMO detector 420, the receive processor 422, the transmit processor 436, and/or the TX MIMO processor 440. The transceiver may be, be similar to, include, or be included in, the transceiver 108 depicted in FIG. 1 and/or the communication interface 230 depicted in FIG. 2. The transceiver may be used by a processor (e.g., the controller/processor 426) and/or a memory 442 to perform aspects of any of the methods described herein (e.g., with reference to FIGS. 7-12).

At the network node 402, the signals from network node 404 and/or other network nodes may be received by one or more antennas of the set of antennas 406a through 406t, processed by one or more modems of the set of modems 416a through 416t (e.g., a demodulator component, shown as DEMOD), detected by a MIMO detector 444 if applicable, and further processed by a receive processor 446 to obtain decoded data and control information sent by the network node 404. The receive processor 446 may provide the decoded data to a data sink 448 and provide the decoded control information to a controller/processor 450. The network node 402 may include a communication unit 452 and may communicate with the network controller 428 via the communication unit 452. The network node 402 may include a scheduler 454 to schedule one or more network nodes 404 for downlink and/or uplink communications. In some examples, one or more modems of the set of modem 416a through 416t of the network node 402 may include a modulator and a demodulator. In some examples, the network node 402 includes a transceiver. The transceiver may include any combination of the antenna(s) 406a through 406t, the modem(s) 416a through 416t, the MIMO detector 444, the receive processor 446, the transmit processor 410, and/or the TX MIMO processor 414. The transceiver may be, be similar to, include, or be included in, the transceiver 108 depicted in FIG. 1 and/or the communication interface 230 depicted in FIG. 2. The transceiver may be used by a processor (e.g., the controller/processor 450) and a memory 456 to perform aspects of any of the methods described herein (e.g., with reference to FIGS. 7-12).

The controller/processor 450 of the network node 402, the controller/processor 426 of the network node 404, and/or any other component(s) of FIG. 4 may perform one or more techniques associated with logical channel groups for sidelink buffer status report forwarding, as described in more detail elsewhere herein. For example, the controller/processor 450 of the network node 402, the controller/processor 426 of the network node 404, and/or any other component(s) of FIG. 4 may perform or direct operations of, for example, process 800 of FIG. 8, process 900 of FIG. 9, and/or other processes as described herein. The memory 442 and the memory 456 may store data and program codes for the network node 402 and the network node 404, respectively. In some examples, the memory 442 and/or the memory 456 may include a non-transitory computer-readable medium storing one or more instructions (e.g., code and/or program code) for wireless communication. For example, the one or more instructions, when executed (e.g., directly, or after compiling, converting, and/or interpreting) by one or more respective processors of the network node 402 and/or the network node 404, may cause the one or more processors, the network node 404, and/or the network node 402 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first network node includes means for receiving, from a second network node of the multi-hop sidelink network, a first sidelink communication comprising second buffer status information associated with the second network node, wherein the second buffer status information is associated with a second LCG of a plurality of LCGs; and/or means for transmitting, to a third network node of the multi-hop sidelink network, a sidelink BSR indicative of the second buffer status information and first buffer status information associated with the first network node, wherein the first buffer status information is associated with a first LCG of the plurality of LCGs.

In some aspects, the first network node includes means for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels; and/or means for receiving, from a second network node, a sidelink BSR indicative of first buffer status information associated with the second network node and second buffer status information associated with a third network node, wherein the first buffer status information is associated with a first LCG of the plurality of LCGs. In some aspects, the means for the first network node to perform operations described herein may include, for example, one or more of communication manager 460, transmit processor 410, TX MIMO processor 414, modem 416, antenna 406, MIMO detector 444, receive processor 446, controller/processor 450, memory 456, or scheduler 454. In some aspects, the means for the first network node to perform operations described herein may include, for example, one or more of communication manager 458, antenna 408, modem 418, MIMO detector 420, receive processor 422, transmit processor 436, TX MIMO processor 440, controller/processor 426, or memory 442.

While blocks in FIG. 4 are illustrated as distinct components, the functions described above with respect to the blocks may be implemented in a single hardware, software, or combination component or in various combinations of components. For example, the functions described with respect to the transmit processor 436, the receive processor 422, and/or the TX MIMO processor 440 may be performed by or under the control of the controller/processor 426. Any number of other combination of various combinations of components depicted in FIG. 4 may be considered to be within the ambit of the present disclosure.

As indicated above, FIG. 4 is provided as an example. Other examples may differ from what is described with regard to FIG. 4.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

"Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 5:
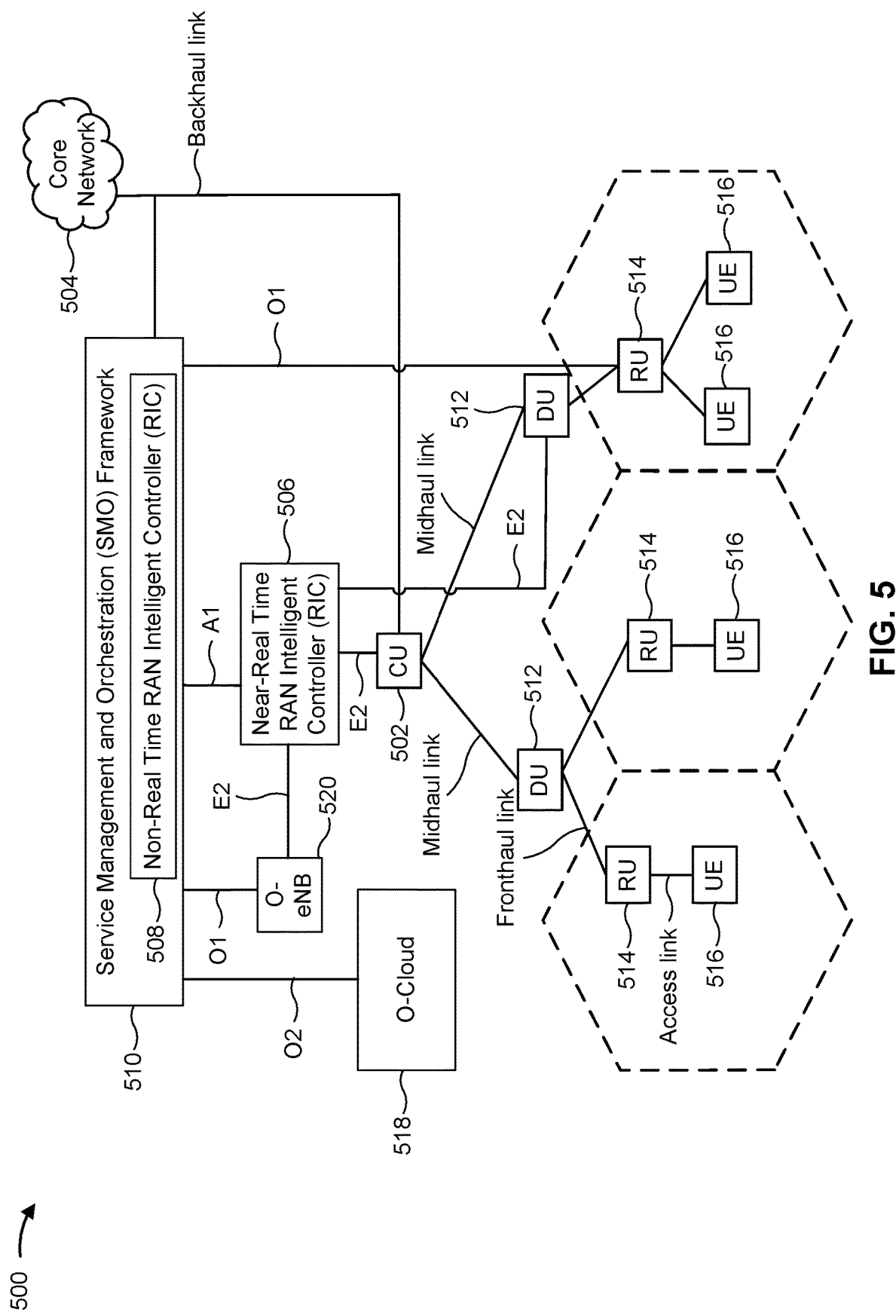
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 502 that can communicate directly with a core network 504 via a backhaul link, or indirectly with the core network 504 through one or more disaggregated control units (such as a Near-RT RIC 506 via an E2 link, or a Non-RT RIC 508 associated with a Service Management and Orchestration (SMO) Framework 510, or both). A CU 502 may communicate with one or more DUs 512 via respective midhaul links, such as through F1 interfaces. Each of the DUs 512 may communicate with one or more RUs 514 via respective fronthaul links. Each of the RUs 514 may communicate with one or more UEs 516 via respective RF access links. In some implementations, a UE 516 may be simultaneously served by multiple RUs 514.

Each of the units, including the CU 502, the DUs 512, the RUs 514, as well as the Near-RT RICs 506, the Non-RT RICs 508, and the SMO Framework 510, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 502 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 502. The CU 502 may be configured to handle user plane functionality (for example, Central Unit-User Plane (CU-UP) functionality), control plane functionality (for example, Central Unit-Control Plane (CU-CP) functionality), or a combination thereof. In some implementations, the CU 502 can be logically split into one or more CU-UP units and one or more CU-CP units. A CU-UP unit can communicate bidirectionally with a CU-CP unit via an interface, such as the E1 interface when implemented in an O-RAN configuration. The CU 502 can be implemented to communicate with a DU 512, as necessary, for network control and signaling.

Each DU 512 may correspond to a logical unit that includes one or more base station functions to control the operation of one or more RUs 514. In some aspects, the DU 512 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 512 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 512, or with the control functions hosted by the CU 502.

Each RU 514 may implement lower-layer functionality. In some deployments, an RU 514, controlled by a DU 512, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 514 can be operated to handle over the air (OTA) communication with one or more UEs 516. In some implementations, real-time and non-real-time aspects of control and user plane communication with the RU(s) 514 can be controlled by the corresponding DU 512. In some scenarios, this configuration can enable each DU 512 and the CU 502 to be implemented in a cloud-based RAN architecture, such as a vRAN architecture.

The SMO Framework 510 may be configured to support RAN deployment and provisioning of non-virtualized and virtualized network elements. For non-virtualized network elements, the SMO Framework 510 may be configured to support the deployment of dedicated physical resources for RAN coverage requirements, which may be managed via an operations and maintenance interface (such as an O1 interface). For virtualized network elements, the SMO Framework 510 may be configured to interact with a cloud computing platform (such as an open cloud (O-Cloud) platform 518) to perform network element life cycle management (such as to instantiate virtualized network elements) via a cloud computing platform interface (such as an O2 interface). Such virtualized network elements can include, but are not limited to, CUs 502, DUs 512, RUs 514, Near-RT RICs 506, and non-RT RICs 508. In some implementations, the SMO Framework 510 can communicate with a hardware aspect of a 4G RAN, such as an open eNB (O-eNB) 520, via an O1 interface. Additionally, in some implementations, the SMO Framework 510 can communicate directly with each of one or more RUs 514 via a respective O1 interface. The SMO Framework 510 also may include a Non-RT RIC 508 configured to support functionality of the SMO Framework 510.

The Non-RT RIC 508 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 506. The Non-RT RIC 508 may be coupled to or communicate with (such as via an A1 interface) the Near-RT RIC 506. The Near-RT RIC 506 may be configured to include a logical function that enables near-real-time control and optimization of RAN elements and resources via data collection and actions over an interface (such as via an E2 interface) connecting one or more CUs 502, one or more DUs 512, or both, as well as an O-eNB 520, with the Near-RT RIC 506.

In some implementations, to generate AI/ML models to be deployed in the Near-RT RIC 506, the Non-RT RIC 508 may receive parameters or external enrichment information from external servers. Such information may be utilized by the Near-RT RIC 506 and may be received at the SMO Framework 510 or the Non-RT RIC 508 from non-network data sources or from network functions. In some examples, the Non-RT RIC 508 or the Near-RT RIC 506 may be configured to tune RAN behavior or performance. For example, the Non-RT RIC 508 may monitor long-term trends and patterns for performance and employ AI/ML models to perform corrective actions through the SMO Framework 510 (such as reconfiguration via an O1 interface) or via creation of RAN management policies (such as A1 interface policies).

As indicated above, FIG. 5 is provided as an example. Other examples may differ from what is described with regard to FIG. 5.

Figure 6:
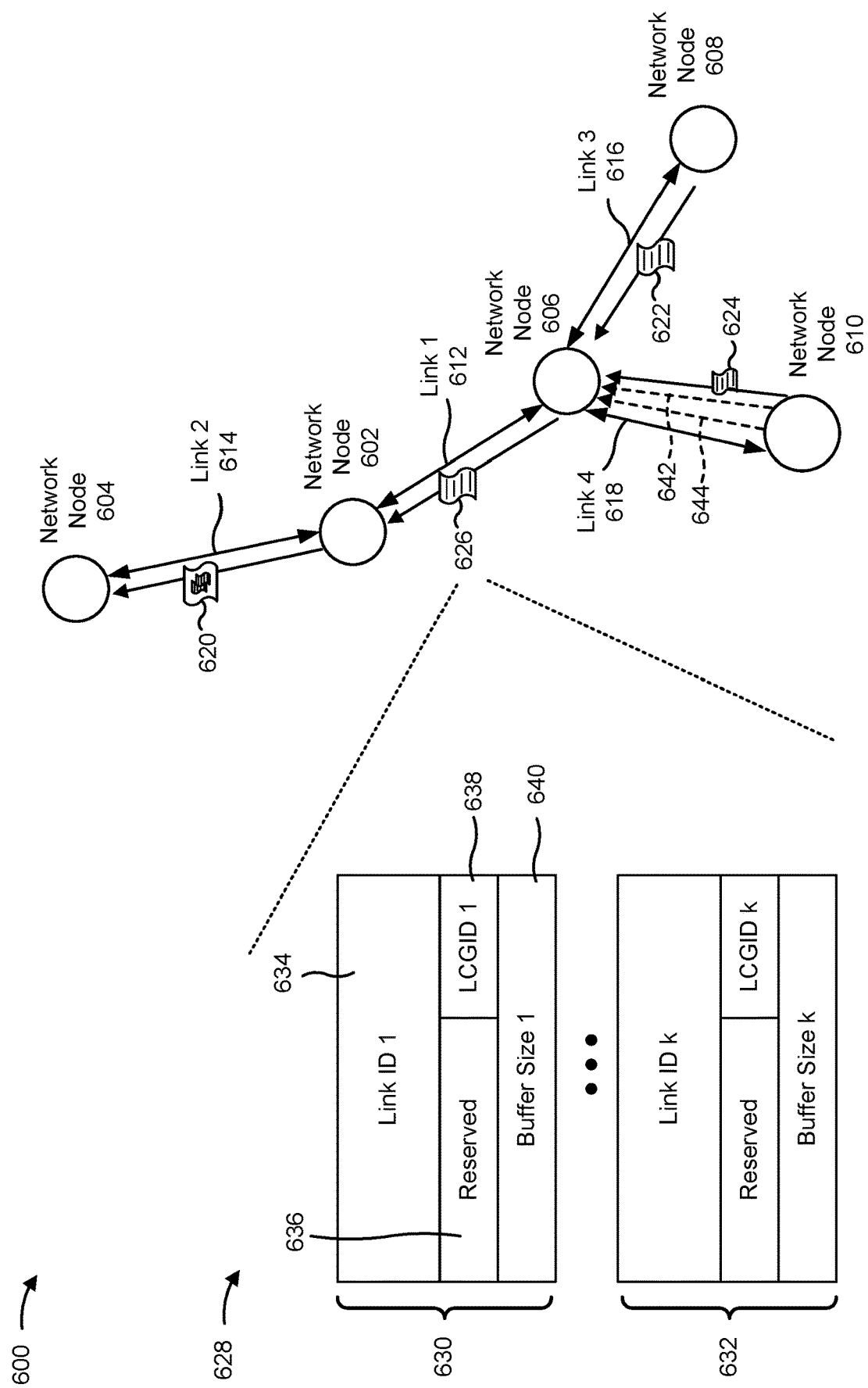
FIG. 6 is a diagram illustrating an example of a multi-hop sidelink network, in accordance with the present disclosure.

FIG. 6 is a diagram illustrating an example 600 of a multi-hop sidelink network, in accordance with the present disclosure. As shown, example 600 may include a network node 602, a network node 604, a network node 606, a network node 608, and a network node 610.

The network node 602 and the network node 604 may communicate via a sidelink 612 (which may be referred to herein as a "communication link" and is shown as "Link 1"). In some sidelink modes, the network node 604 may communicate with the network node 602 via a communication link 614 (shown as "Link 2"), which may be a sidelink or an access link. In some aspects, a direct link between network nodes 602 and 606 (e.g., UEs and/or relay nodes) (e.g., via a PC5 interface) may be referred to as a sidelink, and a direct link between the network node 602 (e.g., a base station or a component of a disaggregated base station) (e.g., via a Uu interface) and the network node 604 may be referred to as an access link. Sidelink communications may be transmitted via the sidelink, and access link communications may be transmitted via the access link. An access link communication may be either a downlink communication (e.g., from a base station to a UE) or an uplink communication (e.g., from a UE to a base station). The network node 606 also may communicate with the network node 608 via a sidelink 616 (shown as "Link 3") and the network node 610 via a sidelink 618 (shown as "Link 4").

In cases in which the network node 604 is a base station, the network node 602 may transmit a sidelink BSR to help the network node 604 with its scheduling decisions. In the BSR, network node 602 may report the buffer size (e.g., the amount of data waiting for transmission) for each logical channel to a destination UE. All data, up to PDCP service data units (SDUs) for which no PDCP data protocol data units (PDUs) have been constructed, may be considered for the BSR. The BSR may be for a logical channel group and include multiple buffer sizes. For example, each logical channel in the BSR may correspond to a logical channel ID, a destination index for a receiving destination UE, and a buffer size for the destination UE. The destination index may be indicated by 5 bits and point to the first 32 entries of a destination UE list reported to the base station via an RRC message. The network node 604 may provide a sidelink resource allocation via downlink control information (DCI) to the UE based on the BSR. However, the network node 604 may not specify the destination UE in the DCI.

In some aspects, a network node (e.g., network node 602) may operate using a transmission mode (e.g., Mode 2), where resource selection and/or scheduling is performed by the network node 602 (e.g., rather than the network node 604). In some aspects, the network node 602 may perform resource selection and/or scheduling by sensing channel availability for transmissions. For example, the network node 602 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the network node 602 may perform resource selection and/or scheduling using sidelink control information (SCI) received from the network node 604, which may indicate occupied resources and/or channel parameters. Additionally, or alternatively, the network node 602 may perform resource selection and/or scheduling by determining a channel busy rate (CBR) associated with various sidelink channels, which may be used for rate control (e.g., by indicating a maximum number of resource blocks that the network node 602 can use for a specified set of subframes).

In the transmission mode where resource selection and/or scheduling is performed by the network node 602, the network node 602 may generate sidelink grants, and may transmit the grants in SCI. A sidelink grant may indicate, for example, one or more parameters (e.g., transmission parameters) to be used for an upcoming sidelink transmission, such as one or more resource blocks to be used for the upcoming sidelink transmission, one or more subframes to be used for the upcoming sidelink transmission, and/or an MCS to be used for the upcoming sidelink transmission. In some aspects, network node 602 may generate a sidelink grant that indicates one or more parameters for semi-persistent scheduling (SPS), such as a periodicity of a sidelink transmission. Additionally, or alternatively, the network node 602 may generate a sidelink grant for event-driven scheduling, such as for an on-demand sidelink message.

In a multi-hop scenario, such as the scenario depicted in FIG. 6, the network node 604 can be unaware of buffer status information associated with the network node 606, the network node 608, and/or the network node 610. In this way, the network node 604 can make resource allocations that are inappropriate (either too large or too small) for downstream network nodes, thereby resulting in ineffective and/or inefficient sidelink resource allocation, and, as a result, negatively impacting network performance.

Some aspects of the techniques and apparatuses described herein may facilitate sidelink buffer status reporting for multi-hop sidelink networks. In some aspects, a first network node may receive, from a second network node, a first sidelink communication that includes second buffer status information associated with the second network node. The first network node may transmit, to a third network node, a sidelink BSR indicative of the second buffer status information and first buffer status information associated with the first network node. For example, the network node 602 may transmit a BSR 620 to the network node 604 that includes buffer status information associated with the network node 602 and downstream network nodes (e.g., the network node 606, the network node 608, and the network node 610). A first network node is downstream from a second network node if the first network node transmits buffer status information to the second network node. A third network node is downstream from the first and second network node if the third network node transmits its buffer status information in the communication direction of the first network node and the second network node, and so on.

For example, the network node 608 may transmit, to the network node 606, a sidelink BSR 622 including buffer status information associated with the network node 608. The network node 610 may transmit, to the network node 606, a sidelink BSR 624 including buffer status information associated with the network node 610. The network node 606 may transmit, to the network node 602, a BSR 626 that includes the buffer status information indicated by the sidelink BSR 622, the buffer status information indicated by the sidelink BSR 624, and buffer status information associated with the network node 606. The network node 602 may transmit, to the network node 604, a BSR 620 that includes the buffer status information indicated by the sidelink BSR 622, the buffer status information indicated by the sidelink BSR 624, the buffer status information associated with the network node 606, and buffer status information associated with the network node 602.

In this way, the network node 604 may be made aware of the buffer status information of the network nodes 602, 606, 608, and 610 and, as a result, can make more appropriate resource allocations and scheduling decisions. For example, in a first use case, based on buffer status information associated with a different part of the network, the network node 604 may dynamically allocate different amounts of sidelink resources. In a second use case, the network node 604 may schedule sidelink resources based on the buffer status information associated with the various network nodes.

In some aspects, the BSR 620 may indicate the buffer status information associated with each downstream network node separately. For example, as shown, the BSR 620 may be transmitted using a MAC CE 628 that includes a first BSR 630 associated with the network node 602 and a kth BSR 632 associated with a kth network node of any k−1 network nodes downstream of network node 602 (e.g., the network node 606, the network node 608, and the network node 610). The BSR 630 may include a field 634 that indicates a link identifier (ID) associated with the Link 2 614, a reserved field 636, a field 638 that indicates an LCGID associated with the Link 2 614, and a field 640 that indicates first buffer status information (shown as "Buffer Size 1") associated with the network node 602. Buffer status information may include, for example, a size of an uplink transmit buffer (e.g., an amount of data stored in the uplink transmit buffer). The BSR 632 may include similar fields that indicate a kth link ID, a kth LCGID, and kth buffer status information associated with the kth network node.

In some aspects, the LCGID may correspond to a relay route associated with the network node 602. The relay route may include a first communication link (e.g., Link 1 612) between the network node 602 and the network node 606, and a second communication link (e.g., Link 4 618) between the network node 606 and the network node 610. In some aspects, the LCGID may be associated with the first communication link and the second communication link.

The sidelink BSR forwarding described above may be performed using a separate sidelink BSR forwarding technique or an aggregated sidelink BSR forwarding technique. In separate sidelink BSR forwarding, as illustrated by the MAC CE 628, the sidelink BSR 626 includes separate indications for the buffer status information associated with the network node 606, the buffer status information associated with network node 608, and the buffer status information associated with network node 610. In aggregated sidelink BSR forwarding, the sidelink BSR 626 indicates buffer status information that is an aggregated buffer size. The aggregated buffer size is an aggregation of the buffer size associated with the network node 606, the buffer size associated with the network node 608, and the buffer size associated with the network node 610.

In some aspects, a reported buffer size may be associated with an LCG. For example, as shown in FIG. 6, a first logical channel 642 and a second logical channel 644 may be associated with the network node 610. The first logical channel 642 and the second logical channel 644 may be included in an LCG having an LCGID (e.g., LCGID k). In some aspects, any number of different LCGs may be associated with the network node 610 and each LCG may include a different set of logical channels. Similarly, although not illustrated in FIG. 6, one or more LCGs (each including one or more logical channels) may be associated with each of the network node 608, the network node 606, and the network node 602. In some cases, the LCGs can be different from one network node to another. For example, two network nodes can have different associated LCGs and/or two LCGs can have a same LCGID but different logical channels.

For example, in a separate sidelink BSR reporting technique, the network node 606 can be configured to forward sidelink BSR 624 to network node 602. The sidelink BSR 624 can be associated with a first LCG (e.g., "LCG 1"), which includes a logical channel having a first logical channel ID ("ID1") and a logical channel having a second logical channel ID ("ID2"). An LCG associated with the network node 606 also may have a first LCG ("LCG 1") but the LCG 1 associated with network node 606 may include logical channels with different logical channel IDs (e.g., "ID3" and "ID4"). The network node 606 cannot use LCG 1 to indicate the forwarded sidelink BSR 624, since the logical channels in the LCG 1 associated with the network node 606 are different from the logical channels in the LCG 1 associated with the network node 610.

In an aggregated sidelink BSR forwarding technique, the network node 606 can be configured to aggregate the sidelink BSR 622 with the sidelink BSR 624. However, the network node 608 may have an LCG 1 that includes logical channels having logical channel IDs that are different from logical channel IDs associated with logical channels in an LCG 1 associated with the network node 610. For example, the LCG 1 associated with the network node 608 may include logical channels having logical channel IDs ID1 and ID2, while the LCG 1 associated with the network node 610 may include logical channels having logical channel IDs ID4 and ID5. The network node 606 can, for example, use LCG 1 to indicate an aggregated buffer size associated with the LCG 1 associated with the network node 608 and the LCG 1 associated with the network node 610, but using more consistent LCGs and/or other strategies for minimizing ambiguity associated with LCG indications may facilitate less ambiguity regarding associated logical channels and, thus, more appropriate sidelink resource grants.

Some aspects of the techniques and apparatuses described herein may include techniques associated with logical channel groups for sidelink buffer status report forwarding in multi-hop sidelink networks. For example, in some aspects, system-wide definitions (e.g., definitions that apply to all network nodes in a multi-hop sidelink network) of LCGs may be used so that an LCG associated with two or more different network nodes includes the same set of logical channels, respectively. For example, each LCGID reported in the MAC CE 628 may be uniquely defined to include a specific set of logical channels. In some aspects, consistent definitions of LCGs may be used without defining system-wide LCG definitions. For example, in some aspects, each LCG of a network node may be defined to be a union of the LCGs of any network nodes downstream of the network node. In some aspects, rather than defining LCGs consistently, a forwarding network node may assign portions of a total buffer size associated with an LCG to one or more logical channels included in the LCG to approximate the distribution of buffer size among the logical channels. In this way, some aspects of the techniques and apparatuses described herein may reduce or remove ambiguity associated with logical channels in forwarded sidelink BSRs and, thus, facilitate increased efficiency and/or effectiveness of sidelink resource allocation, thereby positively impacting network performance.

As indicated above, FIG. 6 is provided as an example. Other examples may differ from what is described with respect to FIG. 6.

Figure 7:
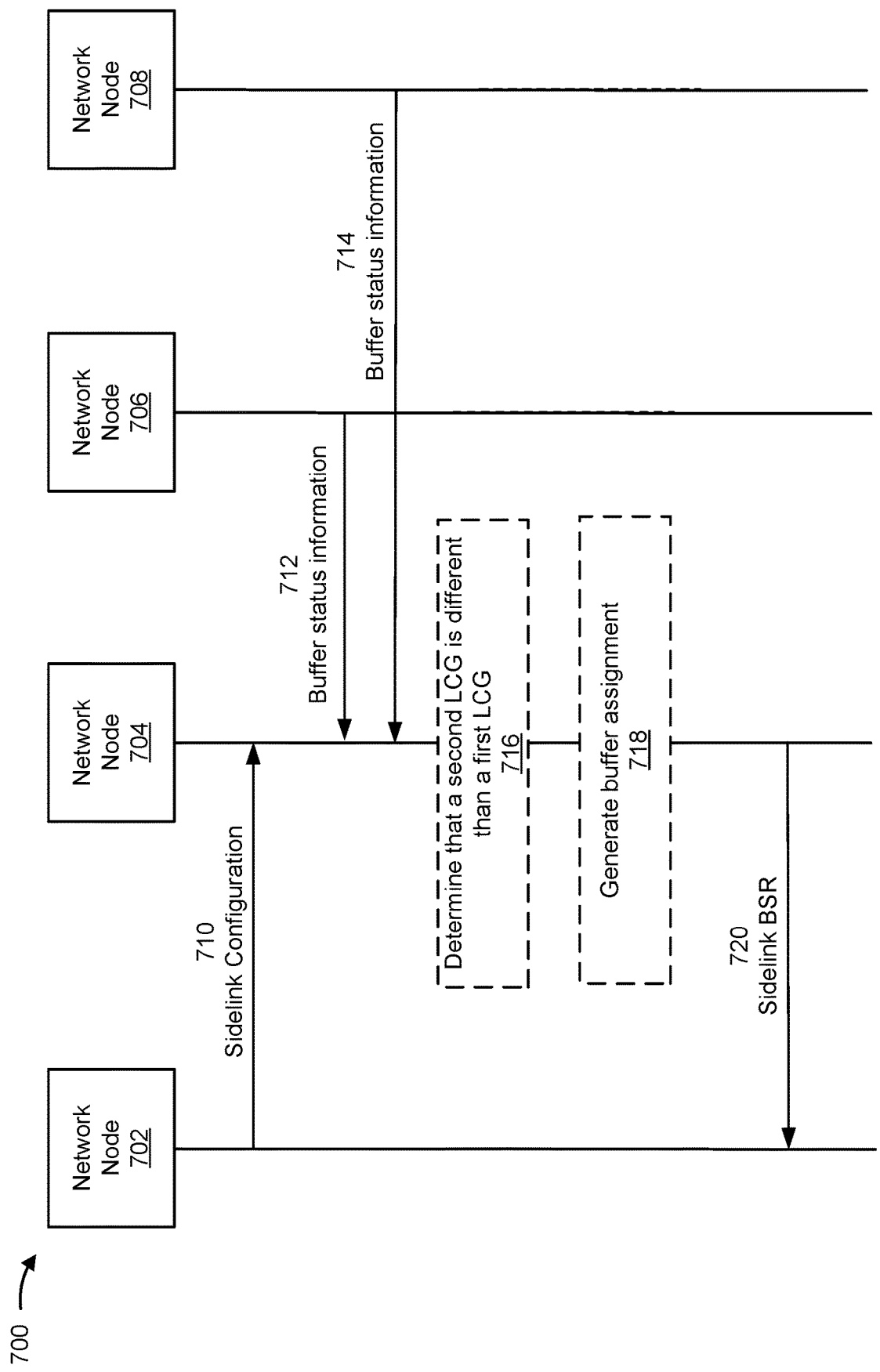
FIG. 7 is a diagram illustrating an example associated with sidelink buffer status reporting for multi-hop sidelink networks, in accordance with the present disclosure.

FIG. 7 is a diagram illustrating an example 700 associated with sidelink buffer status reporting for multi-hop sidelink networks, in accordance with the present disclosure. As shown, example 700 includes a network node 702, a network node 704, a network node 706, and a network node 708. One or more of the network nodes 702, 704, 706, and 708 may be, be similar to, include, or be included in, the network nodes 102A, 102B, 102C, and/or 102D depicted in FIG. 1, the apparatus 200 depicted in FIG. 2, the network nodes 110 and/or 120 depicted in FIG. 3, the network nodes 402 and/or 404 depicted in FIG. 4, the UEs 516 and/or any one or more of the components of the disaggregated base station depicted in FIG. 5. The network nodes 702, 704, 706, and/or 708 may communicate with one another via a multi-hop sidelink network.

In some aspects, the network node 702 may be, or be similar to, the network node 602 depicted in FIG. 6; the network node 704 may be, or be similar to, the network node 606 depicted in FIG. 6; the network node 706 may be, or be similar to, the network node 610 depicted in FIG. 6; and the network node 708 may be, or be similar to, the network node 608 depicted in FIG. 6. For example, the network node 704 may be downstream from the network node 702 and each of the network nodes 706 and 708 may be downstream from the network node 704.

As shown by reference number 710, the network node 702 may transmit, and the network node 704 may receive, a sidelink configuration. In some aspects, the configuration may include a sidelink BSR configuration corresponding to buffer status reporting for a multi-hop sidelink network. The sidelink configuration may be indicative of a mode 1 sidelink configuration or a mode 2 sidelink configuration. In some aspects, the sidelink configuration may be indicative of a mixed mode operation associated with a mode 1 sidelink configuration and a mode 2 sidelink configuration.

As shown by reference number 712, the network node 706 may transmit, and the network node 704 may receive, buffer status information associated with the network node 706. As shown by reference number 714, the network node 708 may transmit, and the network node 704 may receive, buffer status information associated with the network node 708. For the purpose of description, the buffer status information associated with the network node 704 may be referred to as first buffer status information, the buffer status information associated with the network node 706 may be referred to as second buffer status information, and the buffer status information associated with the network node 708 may be referred to as third buffer status information.

The first buffer status information may be associated with a first LCG of a plurality of LCGs, the second buffer status information may be associated with a second LCG of the plurality of LCGs, and the third buffer status information may be associated with a third LCG of the plurality of LCGs. In some aspects, the first buffer status information may be associated with a first set of LCGs of the plurality of LCGs, the second buffer status information may be associated with a second set of LCGs of the plurality of LCGs, and the third buffer status information may be associated with a third set of LCGs of the plurality of LCGs. A set of LCGs may include one or more LCGs of the plurality of LCGs.

In some aspects, the sidelink configuration may indicate a plurality of LCGs corresponding to the multi-hop sidelink network. Each LCG of the plurality of LCGs may include a respective set of logical channels. The sidelink configuration may define the plurality of LCGs such that each LCG having a specified identifier includes a same set of logical channels. For example, a first LCG may be identified by a first LCGID (which may be referred to as "LCGID 1") and a second LCG may be identified by a second LCGID (which may be referred to as "LCGID 2"). The configuration may indicate that, if LCGID 1 has the same value as LCGID 2, then the second LCG includes the same logical channels as the first LCG.

In this way, if the network node 704 forwards sidelink BSR using a separate sidelink BSR forwarding technique, the network node 704 may forward the second buffer status information and/or the third buffer status information as is, including the respective LCGIDs indicated in the BSRs received from the network node 706 and/or the network node 708. If the network node 704 uses an aggregated sidelink BSR forwarding technique, the network node 704 may aggregate buffer sizes associated with equal LCGIDs since two LCGs associated with the same LCGID include the same set of logical channels.

In some aspects, the sidelink configuration may configure the multi-hop sidelink network such that each LCG of a network node is the union of the LCGs of a downstream node. For example a plurality of logical channels may be configured having respective IDs (e.g., "ID1," "ID2," "ID3," "ID4," and "ID5"). The second buffer status information (received from the network node 706) may be associated with a first LCG ("LCG 1") that includes the logical channels having the logical channel IDs ID1 and ID2, respectively, and a second LCG ("LCG 2") that includes the logical channels having the logical channel IDs ID4 and ID 5, respectively. The third buffer status information (received from the network node 708) may be associated with the first LCG ("LCG 1"), but at the network node 708, the LCG 1 may include the logical channels having the logical channel IDs ID1 and ID4. According to the sidelink configuration, the LCG 1 associated with the network node 704 may include the union of the LCG 1 associated with the network node 706 and the LCG 1 associated with the network node 708. Thus, the LCG 1 associated with the network node 704 may include the logical channels having the logical channel IDs ID1, ID2, ID4, and ID5. As a result, if the network node 704 uses an aggregated sidelink BSR forwarding technique, the network node 704 may aggregate the buffer size associated with the LCG 1 and the LCG 2 associated with the network node 706 and the buffer size associated with the LCG 1 associated with the network node 708.

In some aspects, the sidelink configuration may configure the network node 704 to use generate a buffer assignment when the network node 704 receives buffer status information associated with an LCG that is different than an LCG of the network node 704 having a same LCGID. For example, as shown by reference number 716, the network node 704 may determine that the second LCG is different from the first LCG. As shown by reference number 718, the network node 704 may generate, based on determining that the second LCG is different from the first LCG, a buffer assignment. The network node 704 may generate the buffer assignment by assigning at least a portion of the total buffer size to a respective logical channel of the second LCG.

As an example, the second buffer status information (associated with the network node 706) may include a total buffer size associated with the LCG, and the network node 704 may assign one or more portions of the total buffer size to one or more logical channels included in the LCG associated with the network node 706. In some aspects, for example, the total buffer size may be assigned to the logical channel, of the logical channels in the LCG, having a highest associated priority or a lowest associated priority.

In another example, the total buffer size may be assigned evenly (or at least approximately evenly) across the logical channels in the LCG. For example, the network node 704 may generate the buffer assignment by assigning each portion of a plurality of portions of the total buffer size to a respective logical channel of the logical channels in the LCG, where each portion of the plurality of portions of the total buffer size matches each other portion of the plurality of portions of the total buffer size. A portion of a total buffer size matches another portion of the total buffer size when the two portions of the buffer size are equal or at least approximately equal (e.g., wherein a difference between the two portions of the total buffer size is within a specified threshold). In some aspects, for example, BSR bits may be mapped, via a table, to buffer size ranges, rather than an exact buffer size. For example, BSR 52 may refer to a buffer size of greater than or equal to 249 bytes and less than or equal to 264 bytes. In some aspects, when assigning portions of the total buffer size (and/or aggregating buffer sizes in accordance with any of the aspects described herein), the network node 704 may use a lower bound (e.g., a minimum) of the corresponding mapped size range or an upper bound thereof.

As shown by reference number 720, the network node 704 may transmit, and the network node 702 may receive, a sidelink BSR indicative of the buffer status information associated with the network node 706 (e.g., the second buffer status information) and/or the network node 708 (e.g., the third buffer status information) and buffer status information associated with the network node 704 (e.g., the first buffer status information). The sidelink BSR may include a sidelink MAC CE. In some aspects, the second buffer status information may be indicated separately from the first buffer status information. Similarly, the third buffer status information may be indicated separately from the first buffer status information and the second buffer status information.

In some aspects, the sidelink BSR may be an aggregated BSR and may include an aggregated buffer size indication associated with an LCG identifier corresponding to a first LCG (associated with the network node 704) consisting of a first set of logical channels based on a second LCG (associated with the network node 706) consisting of the first set of logical channels. The aggregated buffer size indication may indicate an aggregation of a first buffer size associated with the first buffer status information and a second buffer size associated with the second buffer status information. In some aspects, the sidelink BSR may indicate a buffer assignment.

In some aspects, the network node 704 may transmit the sidelink BSR by transmitting at least one MAC CE that includes the sidelink BSR. In some aspects, the at least one MAC CE may include only one MAC CE that includes the first buffer status information and the second buffer status information. In some aspects, the at least one MAC CE may include a first MAC CE that includes the first buffer status information and a second MAC CE that includes the second buffer status information.

In some aspects, the MAC CE may include a link ID associated with a communication link, associated with the network node 704. In some aspects, the sidelink BSR may include a first hop-depth indication associated with the first buffer status information and a second hop-depth indication associated with the second buffer status information. In some aspects, the sidelink BSR may include an LCGID corresponding to a relay route associated with the network node 704. The relay route may include a first communication link between the network node 704 and the network node 702, and a second communication link between the network node 704 and the network node 706. In some aspects, the LCGID may be associated with the first communication link and the second communication link. In some aspects, the LCGID may be indicative of a MAC CE type of the MAC CE.

As indicated above, FIG. 7 is provided as an example. Other examples may differ from what is described with respect to FIG. 7.

Figure 8:
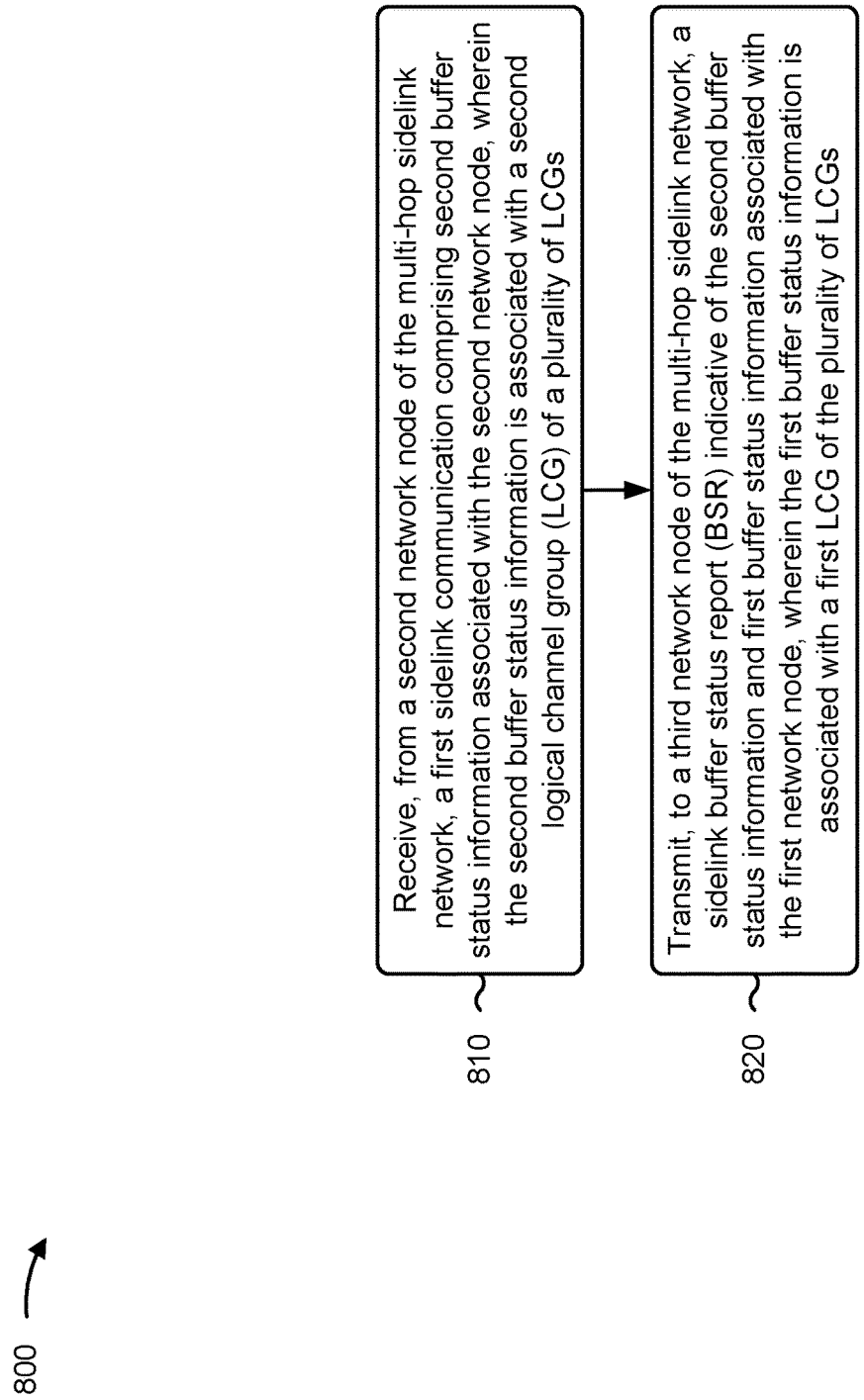
FIG. 8 is a diagram illustrating an example process performed, for example, by a first network node, in accordance with the present disclosure, in accordance with the present disclosure.

FIG. 8 is a diagram illustrating an example process 800 performed, for example, by a first network node, in accordance with the present disclosure. Example process 800 is an example where the first network node (e.g., network node 704) performs operations associated with LCGs for sidelink BSR forwarding.

As shown in FIG. 8, in some aspects, process 800 may include receiving, from a second network node of the multi-hop sidelink network, a first sidelink communication comprising second buffer status information associated with the second network node, wherein the second buffer status information is associated with a second LCG of a plurality of LCGs (block 810). For example, the first network node (e.g., using communication manager 1008 and/or reception component 1002, depicted in FIG. 10) may receive, from a second network node of the multi-hop sidelink network, a first sidelink communication comprising second buffer status information associated with the second network node, wherein the second buffer status information is associated with a second LCG of a plurality of LCGs, as described above.

As further shown in FIG. 8, in some aspects, process 800 may include transmitting, to a third network node of the multi-hop sidelink network, a sidelink BSR indicative of the second buffer status information and first buffer status information associated with the first network node, wherein the first buffer status information is associated with a first LCG of the plurality of LCGs (block 820). For example, the first network node (e.g., using communication manager 1008 and/or transmission component 1004, depicted in FIG. 10) may transmit, to a third network node of the multi-hop sidelink network, a sidelink BSR indicative of the second buffer status information and first buffer status information associated with the first network node, wherein the first buffer status information is associated with a first LCG of the plurality of LCGs, as described above.

Process 800 may include additional aspects, such as any single aspect or any combination of aspects described below and/or in connection with one or more other processes described elsewhere herein.

In a first aspect, the second buffer status information is indicated separately from the first buffer status information. In a second aspect, alone or in combination with the first aspect, process 800 includes receiving a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

In a third aspect, alone or in combination with one or more of the first and second aspects, the first LCG consists of a first set of logical channels and the second LCG consists of the first set of logical channels, and the sidelink BSR comprises an aggregated BSR, the aggregated BSR comprising an aggregated buffer size indication associated with an LCG identifier corresponding to the first LCG based on the second LCG consisting of the first set of logical channels, wherein the aggregated buffer size indication indicates an aggregation of a first buffer size associated with the first buffer status information and a second buffer size associated with the second buffer status information. In a fourth aspect, alone or in combination with one or more of the first through third aspects, the second network node is downstream from the first network node and is associated with a first set of LCGs of the plurality of LCGs, the first set of LCGs comprising the second LCG, wherein a fourth network node is downstream from the first network node and is associated with a second set of LCGs of the plurality of LCGs, and the first LCG comprises a union of the first set of LCGs and the second set of LCGs.

In a fifth aspect, the second buffer status information indicates a total buffer size associated with the second LCG, wherein the second LCG comprises a plurality of logical channels, process 800 includes determining that the second LCG is different from the first LCG, and generating, based on determining that the second LCG is different from the first LCG, a buffer assignment by assigning at least a portion of the total buffer size to a respective logical channel of the second LCG, wherein the sidelink BSR indicates the buffer assignment. In a sixth aspect, alone or in combination with the fifth aspect, generating the buffer assignment comprises assigning the total buffer size to a logical channel having a highest priority of a plurality of priorities corresponding to respective logical channels of the plurality of logical channels. In a seventh aspect, alone or in combination with the fifth aspect, generating the buffer assignment comprises assigning the total buffer size to a logical channel having a lowest priority of a plurality of priorities corresponding to respective logical channels of the plurality of logical channels. In an eighth aspect, alone or in combination with the fifth aspect, generating the buffer assignment comprises assigning each portion of a plurality of portions of the total buffer size to a respective logical channel of the plurality of logical channels, wherein each portion of the plurality of portions of the total buffer size matches each other portion of the plurality of portions of the total buffer size.

In a ninth aspect, alone or in combination with the eighth aspect, each portion of the plurality of portions comprises a portion of an upper bound or a lower bound of a range indicated in a buffer size mapping table, wherein the range corresponds to the total buffer size. In a tenth aspect, alone or in combination with one or more of the first through ninth aspects, transmitting the sidelink BSR comprises transmitting a sidelink MAC CE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
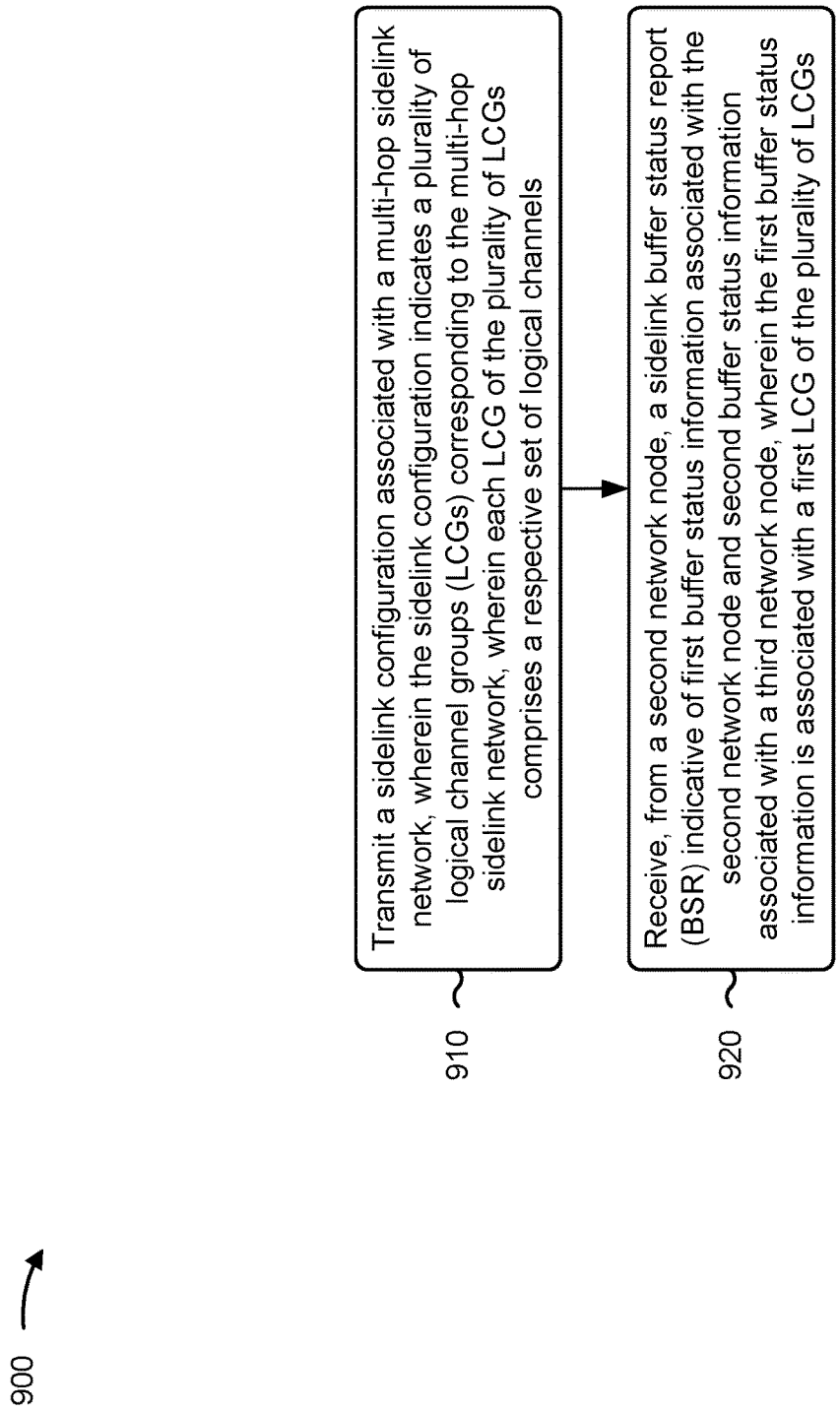
FIG. 9 is a diagram illustrating an example process performed, for example, by a first network node, in accordance with the present disclosure.

FIG. 9 is a diagram illustrating an example process 900 performed, for example, by a first network node, in accordance with the present disclosure. Example process 900 is an example where the first network node (e.g., network node 702) performs operations associated with logical channel groups for sidelink BSR reporting.

As shown in FIG. 9, in some aspects, process 900 may include transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels (block 910). For example, the first network node (e.g., using communication manager 1008 and/or transmission component 1004, depicted in FIG. 10) may transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels, as described above.

As further shown in FIG. 9, in some aspects, process 900 may include receiving, from a second network node, a sidelink BSR indicative of first buffer status information associated with the second network node and second buffer status information associated with a third network node, wherein the first buffer status information is associated with a first LCG of the plurality of LCGs (block 920). For example, the first network node (e.g., using communication manager 1008 and/or reception component 1002, depicted in FIG. 10) may receive, from a second network node, a sidelink BSR indicative of first buffer status information associated with the second network node and second buffer status information associated with a third network node, wherein the first buffer status information is associated with a first LCG of the plurality of LCGs, as described above.

Process 900 may include additional aspects, such as any single aspect or any combination of aspects described below and/or in connection with one or more other processes described elsewhere herein.

In a first aspect, the second buffer status information is indicated separately from the first buffer status information. In a second aspect, alone or in combination with the first aspect, process 900 includes transmitting a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

In a third aspect, alone or in combination with one or more of the first and second aspects, the first LCG consists of a first set of logical channels and the second LCG consists of the first set of logical channels, and the sidelink BSR comprises an aggregated BSR, the aggregated BSR comprising an aggregated buffer size indication associated with an LCG identifier corresponding to the first LCG based on the second LCG consisting of the first set of logical channels, wherein the aggregated buffer size indication indicates an aggregation of a first buffer size associated with the first buffer status information and a second buffer size associated with the second buffer status information.

In a fourth aspect, alone or in combination with one or more of the first through third aspects, the third network node is downstream from the second network node and is associated with a first set of LCGs of the plurality of LCGs, the first set of LCGs comprising the second LCG, wherein a fourth network node is downstream from the second network node and is associated with a second set of LCGs of the plurality of LCGs, and the first LCG comprises a union of the first set of LCGs and the second set of LCGs. In a fifth aspect, alone or in combination with one or more of the first through fourth aspects, receiving the sidelink BSR comprises receiving a sidelink MAC CE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
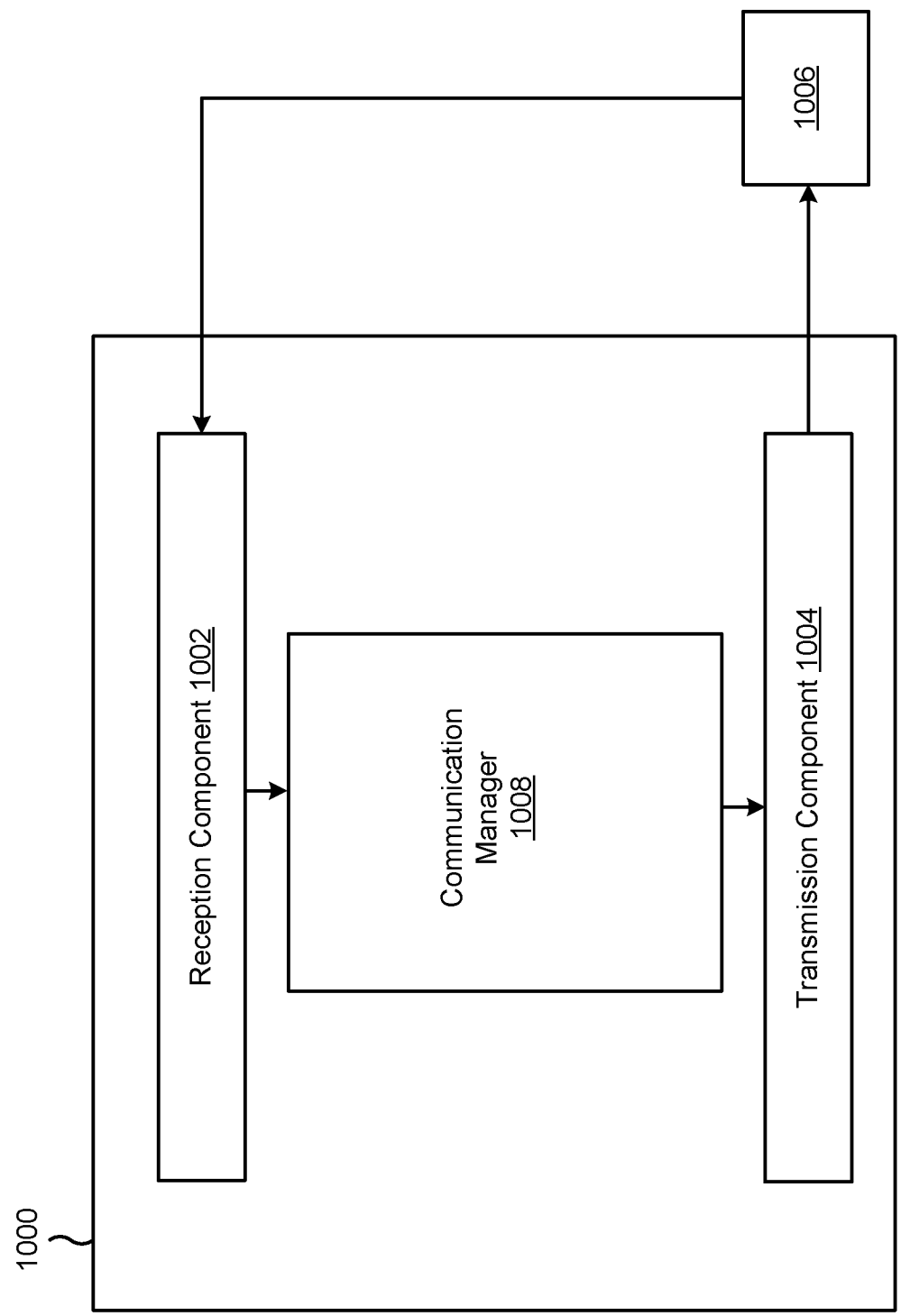
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of one or more of the network nodes described in connection with FIG. 4. Additionally, or alternatively, one or more components shown in FIG. 10 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of one or more of the network nodes described in connection with FIG. 4.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of one or more of the network nodes described in connection with FIG. 4. In some aspects, the transmission component 1004 may be co-located with the reception component 1002 in a transceiver.

The communication manager 1008 and/or the reception component 1002 may receive, from a second network node of the multi-hop sidelink network, a first sidelink communication comprising second buffer status information associated with the second network node, wherein the second buffer status information is associated with a second LCG of a plurality of LCGs. In some aspects, the communication manager 1008 may include one or more antennas, a modem, a controller/processor, a memory, or a combination thereof, of one or more of the network nodes described in connection with FIG. 4. In some aspects, the communication manager 1008 may include the reception component 1002 and/or the transmission component 1004. In some aspects, the communication manager 1008 may include the reception component 1002 and/or the transmission component 1004. In some aspects, the communication manager 1008 may be, be similar to, include, or be included in, the communication manager 106 depicted in FIG. 1.

The communication manager 1008 and/or the transmission component 1004 may transmit, to a third network node of the multi-hop sidelink network, a sidelink BSR indicative of the second buffer status information and first buffer status information associated with the first network node, wherein the first buffer status information is associated with a first LCG of the plurality of LCGs. The communication manager 1008 and/or the reception component 1002 may receive a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

The communication manager 1008 and/or the transmission component 1004 may transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels. The communication manager 1008 and/or the reception component 1002 may receive, from a second network node, a sidelink BSR indicative of first buffer status information associated with the second network node and second buffer status information associated with a third network node, wherein the first buffer status information is associated with a first LCG of the plurality of LCGs. The communication manager 1008 and/or the transmission component 1004 may transmit a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
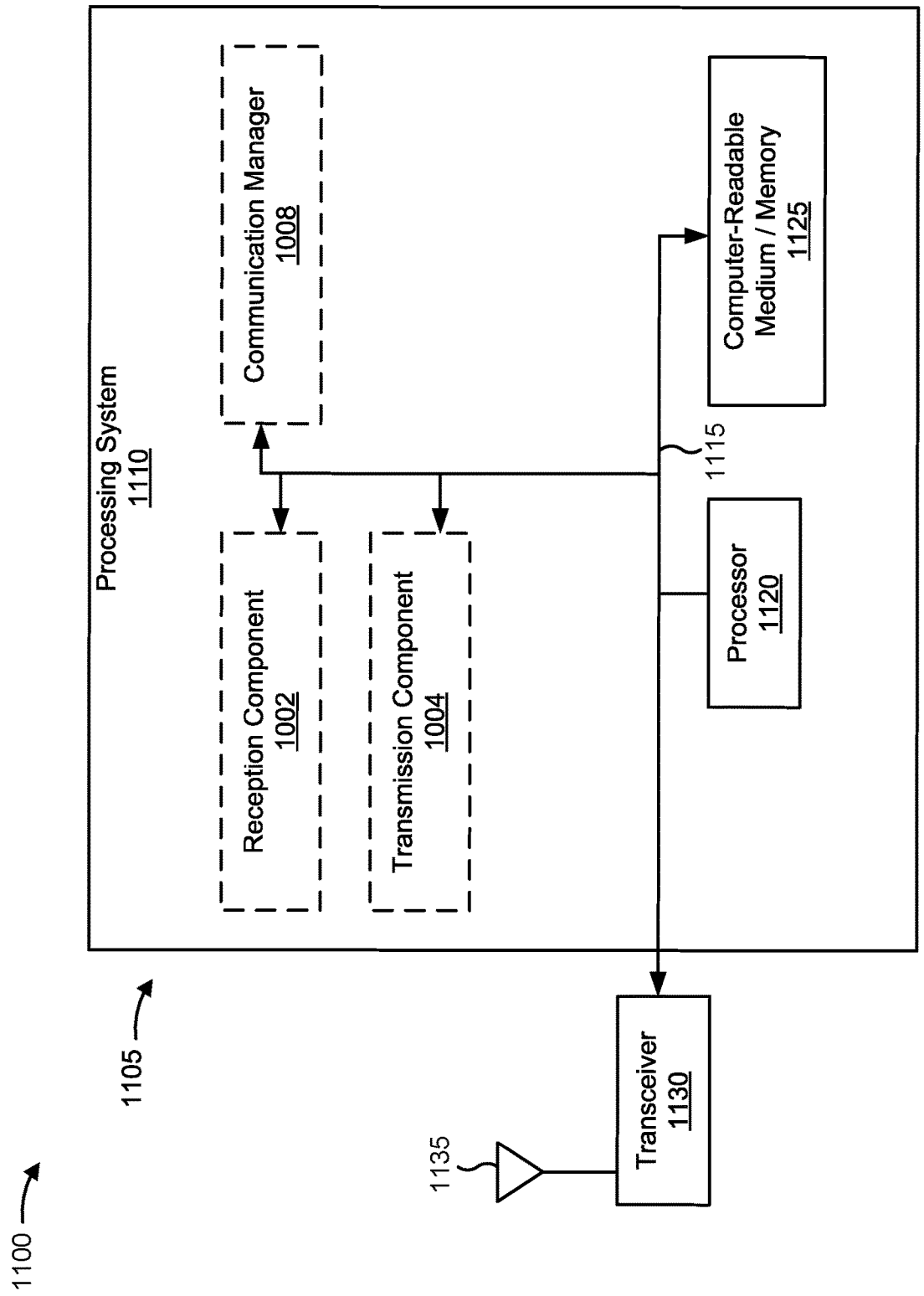
FIG. 11 is a diagram illustrating an example of a hardware implementation for an apparatus employing a processing system, in accordance with the present disclosure.

FIG. 11 is a diagram illustrating an example 1100 of a hardware implementation for an apparatus 1105 employing a processing system 1110, in accordance with the present disclosure. The apparatus 1105 may be a network node.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, and/or power management circuits.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the network node 402 and may include the memory 456 and/or at least one of the TX MIMO processor 414, the receive processor 446, and/or the controller/processor 450. In some aspects, the apparatus 1105 for wireless communication includes means for receiving, from a second network node of the multi-hop sidelink network, a first sidelink communication comprising second buffer status information associated with the second network node, wherein the second buffer status information is associated with a second LCG of a plurality of LCGs; and means for transmitting, to a third network node of the multi-hop sidelink network, a sidelink BSR indicative of the second buffer status information and first buffer status information associated with the first network node, wherein the first buffer status information is associated with a first LCG of the plurality of LCGs. In some aspects, the apparatus 1105 for wireless communication includes means for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels; and means for receiving, from a second network node, a sidelink BSR indicative of first buffer status information associated with the second network node and second buffer status information associated with a third network node, wherein the first buffer status information is associated with a first LCG of the plurality of LCGs. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 414, the receive processor 446, and/or the controller/processor 450. In one configuration, the aforementioned means may be the TX MIMO processor 414, the receive processor 446, and/or the controller/processor 450 configured to perform the functions and/or operations recited herein.

In some aspects, the processing system 1110 may be a component of the network node 404 and may include the memory 442 and/or at least one of the TX MIMO processor 440, the receive processor 422, and/or the controller/processor 426. In some aspects, the apparatus 1105 for wireless communication includes means for receiving, from a second network node of the multi-hop sidelink network, a first sidelink communication comprising second buffer status information associated with the second network node, wherein the second buffer status information is associated with a second LCG of a plurality of LCGs; and means for transmitting, to a third network node of the multi-hop sidelink network, a sidelink BSR indicative of the second buffer status information and first buffer status information associated with the first network node, wherein the first buffer status information is associated with a first LCG of the plurality of LCGs. In some aspects, the apparatus 1105 for wireless communication includes means for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels; and means for receiving, from a second network node, a sidelink BSR indicative of first buffer status information associated with the second network node and second buffer status information associated with a third network node, wherein the first buffer status information is associated with a first LCG of the plurality of LCGs. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 440, the receive processor 422, and/or the controller/processor 426. In one configuration, the aforementioned means may be the TX MIMO processor 440, the receive processor 422, and/or the controller/processor 426 configured to perform the functions and/or operations recited herein.

FIG. 11 is provided as an example. Other examples may differ from what is described in connection with FIG. 11.

Figure 12:
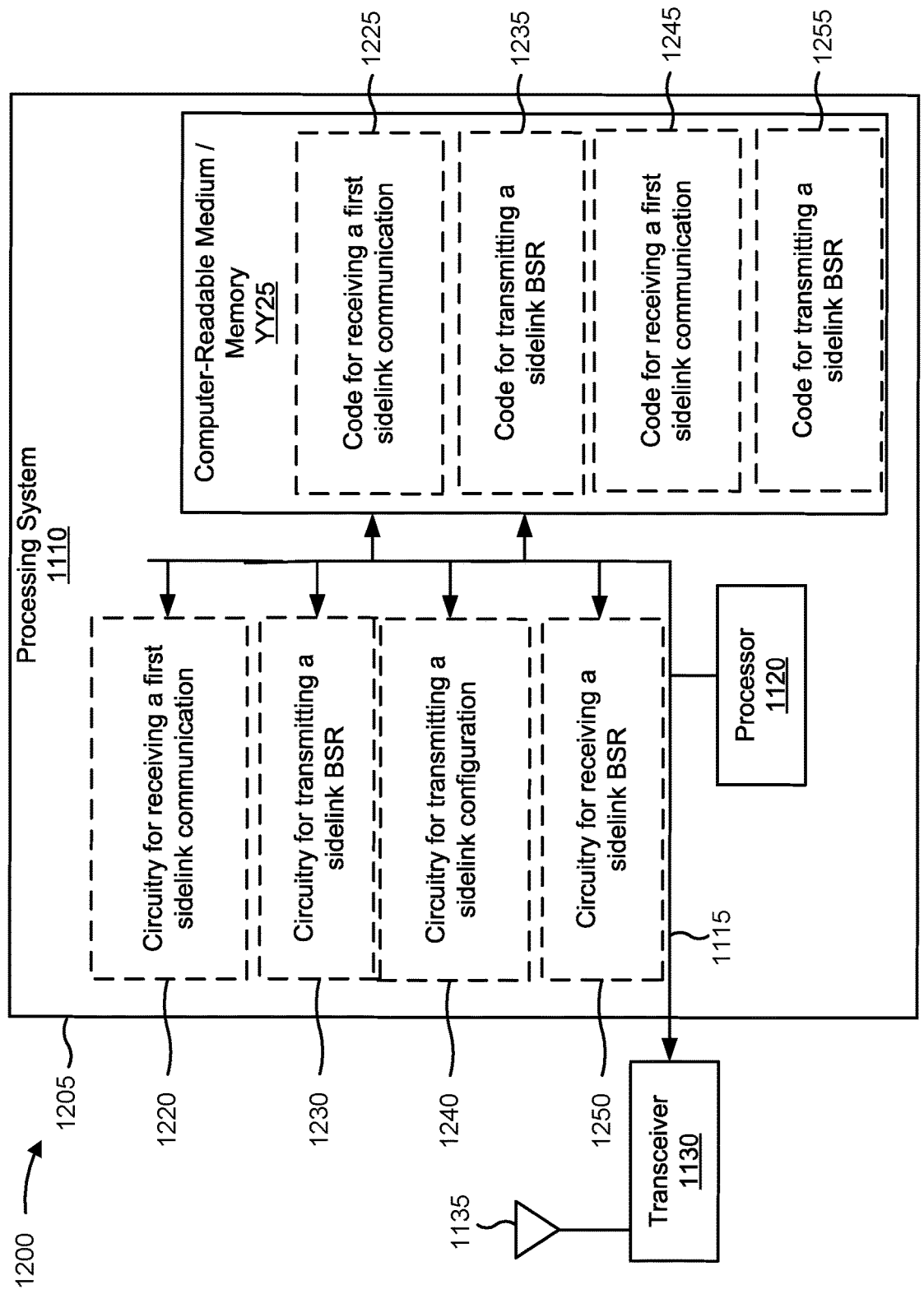
FIG. 12 is a diagram illustrating an example of an implementation of code and circuitry for an apparatus, in accordance with the present disclosure.

FIG. 12 is a diagram illustrating an example 1200 of an implementation of code and circuitry for an apparatus 1205, in accordance with the present disclosure. The apparatus 1205 may be a network node, or a network node may include the apparatus 1205.

As shown in FIG. 12, the apparatus 1205 may include circuitry for receiving, from a second network node of the multi-hop sidelink network, a first sidelink communication comprising second buffer status information associated with the second network node, wherein the second buffer status information is associated with a second LCG of a plurality of LCGs (circuitry 1220). For example, the circuitry 1220 may enable the apparatus 1205 to receive, from a second network node of the multi-hop sidelink network, a first sidelink communication comprising second buffer status information associated with the second network node, wherein the second buffer status information is associated with a second LCG of a plurality of LCGs.

As shown in FIG. 12, the apparatus 1205 may include, stored in computer-readable medium 1125, code for receiving, from a second network node of the multi-hop sidelink network, a first sidelink communication comprising second buffer status information associated with the second network node, wherein the second buffer status information is associated with a second LCG of a plurality of LCGs (code 1225). For example, the code 1225, when executed by processor 1120, may cause processor 1120 to cause transceiver 1130 to receive, from a second network node of the multi-hop sidelink network, a first sidelink communication comprising second buffer status information associated with the second network node, wherein the second buffer status information is associated with a second LCG of a plurality of LCGs.

As shown in FIG. 12, the apparatus 1205 may include circuitry for transmitting, to a third network node of the multi-hop sidelink network, a sidelink BSR indicative of the second buffer status information and first buffer status information associated with the first network node, wherein the first buffer status information is associated with a first LCG of the plurality of LCGs (circuitry 1230). For example, the circuitry 1230 may enable the apparatus 1205 to transmit, to a third network node of the multi-hop sidelink network, a sidelink BSR indicative of the second buffer status information and first buffer status information associated with the first network node, wherein the first buffer status information is associated with a first LCG of the plurality of LCGs.

As shown in FIG. 12, the apparatus 1205 may include, stored in computer-readable medium 1125, code for transmitting, to a third network node of the multi-hop sidelink network, a sidelink BSR indicative of the second buffer status information and first buffer status information associated with the first network node, wherein the first buffer status information is associated with a first LCG of the plurality of LCGs (code 1235). For example, the code 1235, when executed by processor 1120, may cause processor 1120 to cause transceiver 1130 to transmit, to a third network node of the multi-hop sidelink network, a sidelink BSR indicative of the second buffer status information and first buffer status information associated with the first network node, wherein the first buffer status information is associated with a first LCG of the plurality of LCGs.

As shown in FIG. 12, the apparatus 1205 may include circuitry for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels (circuitry 1240). For example, the circuitry 1220 may enable the apparatus 1205 to transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels.

As shown in FIG. 12, the apparatus 1205 may include, stored in computer-readable medium 1125, code for transmitting a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels (code 1245). For example, the code 1225, when executed by processor 1120, may cause processor 1120 to cause transceiver 1130 to transmit a sidelink configuration associated with a multi-hop sidelink network, wherein the sidelink configuration indicates a plurality of LCGs corresponding to the multi-hop sidelink network, wherein each LCG of the plurality of LCGs comprises a respective set of logical channels.

As shown in FIG. 12, the apparatus 1205 may include circuitry for receiving, from a second network node, a sidelink BSR indicative of first buffer status information associated with the second network node and second buffer status information associated with a third network node, wherein the first buffer status information is associated with a first LCG of the plurality of LCGs (circuitry 1250). For example, the circuitry 1230 may enable the apparatus 1205 to receive, from a second network node, a sidelink BSR indicative of first buffer status information associated with the second network node and second buffer status information associated with a third network node, wherein the first buffer status information is associated with a first LCG of the plurality of LCGs.

As shown in FIG. 12, the apparatus 1205 may include, stored in computer-readable medium 1125, code for receiving, from a second network node, a sidelink BSR indicative of first buffer status information associated with the second network node and second buffer status information associated with a third network node, wherein the first buffer status information is associated with a first LCG of the plurality of LCGs (code 1255). For example, the code 1235, when executed by processor 1120, may cause processor 1120 to cause transceiver 1130 to receive, from a second network node, a sidelink BSR indicative of first buffer status information associated with the second network node and second buffer status information associated with a third network node, wherein the first buffer status information is associated with a first LCG of the plurality of LCGs.

FIG. 12 is provided as an example. Other examples may differ from what is described in connection with FIG. 12.

The following provides an overview of some Aspects of the present disclosure:

Aspect 1: A method of wireless communication performed by a first network node of a multi-hop sidelink network, comprising: receiving, from a second network node of the multi-hop sidelink network, a first sidelink communication comprising second buffer status information associated with the second network node, wherein the second buffer status information is associated with a second logical channel group (LCG) of a plurality of LCGs; and transmitting, to a third network node of the multi-hop sidelink network, a sidelink buffer status report (BSR) indicative of the second buffer status information and first buffer status information associated with the first network node, wherein the first buffer status information is associated with a first LCG of the plurality of LCGs.

Aspect 2: The method of Aspect 1, wherein the second buffer status information is indicated separately from the first buffer status information.

Aspect 3: The method of either of Aspects 1 or 2, further comprising receiving a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

Aspect 4: The method of any of Aspects 1-3, wherein the first LCG consists of a first set of logical channels and the second LCG consists of the first set of logical channels, and wherein the sidelink BSR comprises an aggregated BSR, the aggregated BSR comprising an aggregated buffer size indication associated with an LCG identifier corresponding to the first LCG based on the second LCG consisting of the first set of logical channels, wherein the aggregated buffer size indication indicates an aggregation of a first buffer size associated with the first buffer status information and a second buffer size associated with the second buffer status information.

Aspect 5: The method of any of Aspects 1-4, wherein the second network node is downstream from the first network node and is associated with a first set of LCGs of the plurality of LCGs, the first set of LCGs comprising the second LCG, wherein a fourth network node is downstream from the first network node and is associated with a second set of LCGs of the plurality of LCGs, and wherein the first LCG comprises a union of the first set of LCGs and the second set of LCGs.

Aspect 6: The method of Aspect 1, wherein the second buffer status information indicates a total buffer size associated with the second LCG, wherein the second LCG comprises a plurality of logical channels, the method further comprising: determining that the second LCG is different from the first LCG; and generating, based on determining that the second LCG is different from the first LCG, a buffer assignment by assigning at least a portion of the total buffer size to a respective logical channel of the second LCG, wherein the sidelink BSR indicates the buffer assignment.

Aspect 7: The method of Aspect 6, wherein generating the buffer assignment comprises assigning the total buffer size to a logical channel having a highest priority of a plurality of priorities corresponding to respective logical channels of the plurality of logical channels.

Aspect 8: The method of Aspect 6, wherein generating the buffer assignment comprises assigning the total buffer size to a logical channel having a lowest priority of a plurality of priorities corresponding to respective logical channels of the plurality of logical channels.

Aspect 9: The method of Aspect 6, wherein generating the buffer assignment comprises assigning each portion of a plurality of portions of the total buffer size to a respective logical channel of the plurality of logical channels, wherein each portion of the plurality of portions of the total buffer size matches each other portion of the plurality of portions of the total buffer size.

Aspect 10: The method of Aspect 9, wherein each portion of the plurality of portions comprises a portion of an upper bound or a lower bound of a range indicated in a buffer size mapping table, wherein the range corresponds to the total buffer size.

Aspect 11: The method of any of Aspects 1-10, wherein transmitting the sidelink BSR comprises transmitting a sidelink medium access control (MAC) control element (MAC CE).

Aspect 12: A method of wireless communication performed by a first network node, comprising: transmitting a sidelink configuration associated with a multi-hop sidelink network, wherein the sidelink configuration indicates a plurality of logical channel groups (LCGs) corresponding to the multi-hop sidelink network, wherein each LCG of the plurality of LCGs comprises a respective set of logical channels; and receiving, from a second network node, a sidelink buffer status report (BSR) indicative of first buffer status information associated with the second network node and second buffer status information associated with a third network node, wherein the first buffer status information is associated with a first LCG of the plurality of LCGs.

Aspect 13: The method of Aspect 12, wherein the second buffer status information is indicated separately from the first buffer status information.

Aspect 14: The method of either of Aspects 12 or 13, further comprising transmitting a sidelink configuration associated with the multi-hop sidelink network, wherein the sidelink configuration indicates the plurality of LCGs corresponding to the multi-hop sidelink network, wherein each LCG of the plurality of LCGs comprises a respective set of logical channels.

Aspect 15: The method of any of Aspects 12-14, wherein the first LCG consists of a first set of logical channels and the second LCG consists of the first set of logical channels, and wherein the sidelink BSR comprises an aggregated BSR, the aggregated BSR comprising an aggregated buffer size indication associated with an LCG identifier corresponding to the first LCG based on the second LCG consisting of the first set of logical channels, wherein the aggregated buffer size indication indicates an aggregation of a first buffer size associated with the first buffer status information and a second buffer size associated with the second buffer status information.

Aspect 16: The method of any of Aspects 12-15, wherein the third network node is downstream from the second network node and is associated with a first set of LCGs of the plurality of LCGs, the first set of LCGs comprising the second LCG, wherein a fourth network node is downstream from the second network node and is associated with a second set of LCGs of the plurality of LCGs, and wherein the first LCG comprises a union of the first set of LCGs and the second set of LCGs.

Aspect 17: The method of any of Aspects 12-16, wherein receiving the sidelink BSR comprises receiving a sidelink medium access control (MAC) control element (MAC CE).

Aspect 18: An apparatus for wireless communication at a device, comprising a processor; memory coupled with the processor; and instructions stored in the memory and executable by the processor to cause the apparatus to perform the method of one or more of Aspects 1-11.

Aspect 19: A device for wireless communication, comprising a memory and one or more processors coupled to the memory, the one or more processors configured to perform the method of one or more of Aspects 1-11.

Aspect 20: An apparatus for wireless communication, comprising at least one means for performing the method of one or more of Aspects 1-11.

Aspect 21: A non-transitory computer-readable medium storing code for wireless communication, the code comprising instructions executable by a processor to perform the method of one or more of Aspects 1-11.

Aspect 22: A non-transitory computer-readable medium storing a set of instructions for wireless communication, the set of instructions comprising one or more instructions that, when executed by one or more processors of a device, cause the device to perform the method of one or more of Aspects 1-11.

Aspect 23: An apparatus for wireless communication at a device, comprising a processor; memory coupled with the processor; and instructions stored in the memory and executable by the processor to cause the apparatus to perform the method of one or more of Aspects 12-17.

Aspect 24: A device for wireless communication, comprising a memory and one or more processors coupled to the memory, the one or more processors configured to perform the method of one or more of Aspects 12-17.

Aspect 25: An apparatus for wireless communication, comprising at least one means for performing the method of one or more of Aspects 12-17.

Aspect 26: A non-transitory computer-readable medium storing code for wireless communication, the code comprising instructions executable by a processor to perform the method of one or more of Aspects 12-17.

Aspect 27: A non-transitory computer-readable medium storing a set of instructions for wireless communication, the set of instructions comprising one or more instructions that, when executed by one or more processors of a device, cause the device to perform the method of one or more of Aspects 12-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network node, comprising:
   one or more memories; and
   one or more processors, coupled to the one or more memories, configured to cause the first network node to:
      receive, from a second network node of a multi-hop sidelink network, a first sidelink communication comprising second buffer status information associated with the second network node, wherein the second buffer status information is associated with a second logical channel group (LCG) of a plurality of LCGs; and
      transmit, to a third network node of the multi-hop sidelink network, a sidelink buffer status report (BSR) indicative of the second buffer status information and first buffer status information associated with the first network node, wherein:
         the first buffer status information is associated with a first LCG of the plurality of LCGs,
         the first LCG consists of a first set of logical channels and the second LCG consists of the first set of logical channels,
         the sidelink BSR comprises an aggregated BSR,
         the aggregated BSR comprises an aggregated buffer size indication associated with an LCG identifier corresponding to the first LCG based on the second LCG consisting of the first set of logical channels, and
         the aggregated buffer size indication indicates an aggregation of a first buffer size associated with the first buffer status information and a second buffer size associated with the second buffer status information.

2. The apparatus of claim 1, wherein the second buffer status information is indicated separately from the first buffer status information.

3. The apparatus of claim 1, wherein the one or more processors are further configured to cause the first network node to receive a sidelink configuration associated with the multi-hop sidelink network, wherein the sidelink configuration indicates the plurality of LCGs corresponding to the multi-hop sidelink network.

4. The apparatus of claim 1, wherein the second network node is downstream from the first network node and is associated with a first set of LCGs of the plurality of LCGs, the first set of LCGs comprising the second LCG, wherein a fourth network node is downstream from the first network node and is associated with a second set of LCGs of the plurality of LCGs, and wherein the first LCG comprises a union of the first set of LCGs and the second set of LCGs.

5. The apparatus of claim 1, wherein the one or more processors, to cause the first network node to transmit the sidelink BSR, are configured to cause the first network node to transmit a sidelink medium access control (MAC) control element (MAC CE).

6. An apparatus for wireless communication at a first network node, comprising:
   one or more memories; and
   one or more processors, coupled to the one or more memories, configured to cause the first network node to:

receive, from a second network node of a multi-hop sidelink network, a first sidelink communication comprising second buffer status information associated with the second network node, wherein the second buffer status information is associated with a second logical channel group (LCG) of a plurality of LCGs, wherein the second buffer status information indicates a total buffer size associated with the second LCG, and wherein the second LCG comprises a plurality of logical channels;

determine that the second LCG is different from a first LCG of the plurality of LCGs;

generate, based on determining that the second LCG is different from the first LCG, a buffer assignment by assigning at least a portion of the total buffer size to a respective logical channel of the second LCG; and transmit, to a third network node of the multi-hop sidelink network, a sidelink buffer status report (BSR) indicative of the second buffer status information and first buffer status information associated with the first network node, wherein the first buffer status information is associated with the first LCG, and wherein the sidelink BSR indicates the buffer assignment.

7. The apparatus of claim 6, wherein the one or more processors, to cause the first network node to generate the buffer assignment, are configured to cause the first network node to assign the total buffer size to a logical channel having a highest priority of a plurality of priorities corresponding to respective logical channels of the plurality of logical channels.

8. The apparatus of claim 6, wherein the one or more processors, to cause the first network node to generate the buffer assignment, are configured to cause the first network node to assign the total buffer size to a logical channel having a lowest priority of a plurality of priorities corresponding to respective logical channels of the plurality of logical channels.

9. The apparatus of claim 6, wherein the one or more processors, to cause the first network node to generate the buffer assignment, are configured to cause the first network node to assign each portion of a plurality of portions of the total buffer size to a respective logical channel of the plurality of logical channels, wherein each portion of the plurality of portions of the total buffer size matches each other portion of the plurality of portions of the total buffer size.

10. The apparatus of claim 9, wherein each portion of the plurality of portions of the total buffer size comprises:
  a respective portion of an upper bound of a range indicated in a buffer size mapping table, or
  a respective portion of a lower bound of the range, wherein the range corresponds to the total buffer size.

11. An apparatus for wireless communication at a first network node, comprising:
  one or more memories; and
  one or more processors, coupled to the one or more memories, configured to cause the first network node to:
    transmit a sidelink configuration associated with a multi-hop sidelink network, wherein the sidelink configuration indicates a plurality of logical channel groups (LCGs) corresponding to the multi-hop sidelink network, wherein each LCG of the plurality of LCGs comprises a respective set of logical channels; and
    receive, from a second network node, a sidelink buffer status report (BSR) indicative of first buffer status information associated with the second network node and second buffer status information associated with a third network node, wherein:
      the first buffer status information is associated with a first LCG of the plurality of LCGs,
      the first LCG consists of a first set of logical channels and a second LCG consists of the first set of logical channels,
      the sidelink BSR comprises an aggregated BSR,
      the aggregated BSR comprises an aggregated buffer size indication associated with an LCG identifier corresponding to the first LCG based on the second LCG consisting of the first set of logical channels, and
      the aggregated buffer size indication indicates an aggregation of a first buffer size associated with the first buffer status information and a second buffer size associated with the second buffer status information.

12. The apparatus of claim 11, wherein the second buffer status information is indicated separately from the first buffer status information.

13. The apparatus of claim 11, wherein the one or more processors are further configured to cause the first network node to transmit a sidelink configuration associated with the multi-hop sidelink network, wherein the sidelink configuration indicates the plurality of LCGs corresponding to the multi-hop sidelink network.

14. The apparatus of claim 11, wherein the third network node is downstream from the second network node and is associated with a first set of LCGs of the plurality of LCGs, the first set of LCGs comprising the second LCG, wherein a fourth network node is downstream from the second network node and is associated with a second set of LCGs of the plurality of LCGs, and wherein the first LCG comprises a union of the first set of LCGs and the second set of LCGs.

15. The apparatus of claim 11, wherein the one or more processors, to cause the first network node to receive the sidelink BSR, are configured to cause the first network node to receive a sidelink medium access control (MAC) control element (MAC CE).

16. A method of wireless communication performed by a first network node of a multi-hop sidelink network, comprising:
  receiving, from a second network node of the multi-hop sidelink network, a first sidelink communication comprising second buffer status information associated with the second network node, wherein the second buffer status information is associated with a second logical channel group (LCG) of a plurality of LCGs; and
  transmitting, to a third network node of the multi-hop sidelink network, a sidelink buffer status report (BSR) indicative of the second buffer status information and first buffer status information associated with the first network node, wherein:
    the first buffer status information is associated with a first LCG of the plurality of LCGs,
    the first LCG consists of a first set of logical channels and the second LCG consists of the first set of logical channels,
    the sidelink BSR comprises an aggregated BSR,
    the aggregated BSR comprises an aggregated buffer size indication associated with an LCG identifier corresponding to the first LCG based on the second LCG consisting of the first set of logical channels, and the aggregated buffer size indication indicates an aggregation of a first buffer size associated with the first buffer status information and a second buffer size associated with the second buffer status information.

17. The method of claim 16, wherein the second buffer status information is indicated separately from the first buffer status information.

18. The method of claim 16, further comprising receiving a sidelink configuration associated with the multi-hop sidelink network, wherein the sidelink configuration indicates the plurality of LCGs corresponding to the multi-hop sidelink network.

19. The method of claim 16, wherein the second network node is downstream from the first network node and is associated with a first set of LCGs of the plurality of LCGs, the first set of LCGs comprising the second LCG, wherein a fourth network node is downstream from the first network node and is associated with a second set of LCGs of the plurality of LCGs, and wherein the first LCG comprises a union of the first set of LCGs and the second set of LCGs.

20. The method of claim 16, wherein transmitting the sidelink BSR comprises transmitting a sidelink medium access control (MAC) control element (MAC CE).

21. A method of wireless communication performed by a first network node of a multi-hop sidelink network, comprising:
    receiving, from a second network node of the multi-hop sidelink network, a first sidelink communication comprising second buffer status information associated with the second network node, wherein the second buffer status information is associated with a second logical channel group (LCG) of a plurality of LCGs, wherein the second buffer status information indicates a total buffer size associated with the second LCG, and wherein the second LCG comprises a plurality of logical channels;
    determining that the second LCG is different from a first LCG of the plurality of LCGs;
    generating, based on determining that the second LCG is different from the first LCG, a buffer assignment by assigning at least a portion of the total buffer size to a respective logical channel of the second LCG; and
    transmitting, to a third network node of the multi-hop sidelink network, a sidelink buffer status report (BSR) indicative of the second buffer status information and first buffer status information associated with the first network node, wherein the first buffer status information is associated with the first LCG of the plurality of LCGs, and wherein the sidelink BSR indicates the buffer assignment.

22. The method of claim 21, wherein generating the buffer assignment comprises assigning the total buffer size to a logical channel having a highest priority of a plurality of priorities corresponding to respective logical channels of the plurality of logical channels.

23. The method of claim 21, wherein generating the buffer assignment comprises assigning the total buffer size to a logical channel having a lowest priority of a plurality of priorities corresponding to respective logical channels of the plurality of logical channels.

24. The method of claim 21, wherein generating the buffer assignment comprises assigning each portion of a plurality of portions of the total buffer size to a respective logical channel of the plurality of logical channels, wherein each portion of the plurality of portions of the total buffer size matches each other portion of the plurality of portions of the total buffer size.

25. The method of claim 24, wherein each portion of the plurality of portions of the total buffer size comprises:
    a respective portion of an upper bound of a range indicated in a buffer size mapping table, or
    a respective portion of a lower bound of the range,
    wherein the range corresponds to the total buffer size.

26. A method of wireless communication performed by a first network node, comprising:
    transmitting a sidelink configuration associated with a multi-hop sidelink network, wherein the sidelink configuration indicates a plurality of logical channel groups (LCG) corresponding to the multi-hop sidelink network, wherein each LCG of the plurality of LCGs comprises a respective set of logical channels; and
    receiving, from a second network node, a sidelink buffer status report (BSR) indicative of first buffer status information associated with the second network node and second buffer status information associated with a third network node, wherein:
        the first buffer status information is associated with a first LCG of the plurality of LCGs,
        the first LCG consists of a first set of logical channels and a second LCG consists of the first set of logical channels,
        the sidelink BSR comprises an aggregated BSR,
        the aggregated BSR comprises an aggregated buffer size indication associated with an LCG identifier corresponding to the first LCG based on the second LCG consisting of the first set of logical channels, and
        the aggregated buffer size indication indicates an aggregation of a first buffer size associated with the first buffer status information and a second buffer size associated with the second buffer status information.

27. The method of claim 26, further comprising transmitting a sidelink configuration associated with the multi-hop sidelink network, wherein the sidelink configuration indicates the plurality of LCGs corresponding to the multi-hop sidelink network.

28. A non-transitory computer-readable medium storing one or more instructions for wireless communication, the one or more instructions comprising:
    one or more instructions that, when executed by one or more processors of a first network node, cause the one or more processors to:
        receive, from a second network node of a multi-hop sidelink network, a first sidelink communication comprising second buffer status information associated with the second network node, wherein the second buffer status information is associated with a second logical channel group (LCG) of a plurality of LCGs; and
        transmit, to a third network node of the multi-hop sidelink network, a sidelink buffer status report (BSR) indicative of the second buffer status information and first buffer status information associated with the first network n, wherein:
            the first buffer status information is associated with a first LCG of the plurality of LCGs,
            the first LCG consists of a first set of logical channels and the second LCG consists of the first set of logical channels,
            the sidelink BSR comprises an aggregated BSR,
            the aggregated BSR comprises an aggregated buffer size indication associated with an LCG identifier corresponding to the first LCG based on the second LCG consisting of the first set of logical channels, and the aggregated buffer size indication indicates an aggregation of a first buffer size associated with the first buffer status information and a second buffer size associated with the second buffer status information.

29. A non-transitory computer-readable medium storing one or more instructions for wireless communication, the one or more instructions comprising:

one or more instructions that, when executed by one or more processors of a first network node, cause the one or more processors to:

receive, from a second network node of a multi-hop sidelink network, a first sidelink communication comprising second buffer status information associated with the second network node, wherein the second buffer status information is associated with a second logical channel group (LCG) of a plurality of LCGs, wherein the second buffer status information indicates a total buffer size associated with the second LCG, and wherein the second LCG comprises a plurality of logical channels;

determine that the second LCG is different from a first LCG of the plurality of LCGs;

generate, based on determining that the second LCG is different from the first LCG, a buffer assignment by assigning at least a portion of the total buffer size to a respective logical channel of the second LCG; and transmit, to a third network node of the multi-hop sidelink network, a sidelink buffer status report (BSR) indicative of the second buffer status information and first buffer status information associated with the first network node, wherein the first buffer status information is associated with the first LCG, and wherein the sidelink BSR indicates the buffer assignment.

30. A non-transitory computer-readable medium storing one or more instructions for wireless communication, the one or more instructions comprising:

one or more instructions that, when executed by one or more processors of a first network node, cause the one or more processors to:

transmit a sidelink configuration associated with a multi-hop sidelink network, wherein the sidelink configuration indicates a plurality of logical channel groups (LCGs) corresponding to the multi-hop sidelink network, wherein each LCG of the plurality of LCGs comprises a respective set of logical channels; and receive, from a second network node, a sidelink buffer status report (BSR) indicative of first buffer status information associated with the second network node and second buffer status information associated with a third network node, wherein:

the first buffer status information is associated with a first LCG of the plurality of LCGs, the first LCG consists of a first set of logical channels and a second LCG consists of the first set of logical channels, the sidelink BSR comprises an aggregated BSR, the aggregated BSR comprises an aggregated buffer size indication associated with an LCG identifier corresponding to the first LCG based on the second LCG consisting of the first set of logical channels, and the aggregated buffer size indication indicates an aggregation of a first buffer size associated with the first buffer status information and a second buffer size associated with the second buffer status information.

31. An apparatus for wireless communication at a first network node, comprising:

one or more memories; and one or more processors, coupled to the one or more memories, configured to cause the first network node to:

receive, from a second network node of a multi-hop sidelink network, a first sidelink communication comprising second buffer status information associated with the second network node, wherein the second buffer status information is associated with a second logical channel group (LCG) of a plurality of LCGs; and transmit, to a third network node of the multi-hop sidelink network, a sidelink buffer status report (BSR) indicative of the second buffer status information and first buffer status information associated with the first network node, wherein:

the first buffer status information is associated with a first LCG of the plurality of LCGs, the second network node is downstream from the first network node and is associated with a first set of LCGs of the plurality of LCGs, a fourth network node is downstream from the first network node and is associated with a second set of LCGs of the plurality of LCGs, and the first LCG comprises a union of the first set of LCGs and the second set of LCGs.

32. The apparatus of claim 31, wherein the second buffer status information is indicated separately from the first buffer status information.

33. The apparatus of claim 31, wherein the one or more processors are further configured to cause the first network node to receive a sidelink configuration associated with the multi-hop sidelink network, wherein the sidelink configuration indicates the plurality of LCGs corresponding to the multi-hop sidelink network.

\* \* \* \* \*